United States Patent
Sakaguchi et al.

(10) Patent No.: US 8,178,185 B2
(45) Date of Patent: *May 15, 2012

(54) HONEYCOMB STRUCTURED BODY, METHOD FOR MANUFACTURING HONEYCOMB STRUCTURED BODY AND EXHAUST GAS PURIFYING DEVICE

(75) Inventors: Hiroshi Sakaguchi, Gifu (JP); Kazushige Ohno, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 1377 days.

This patent is subject to a terminal disclaimer.

(21) Appl. No.: 11/600,775

(22) Filed: Nov. 17, 2006

(65) Prior Publication Data
US 2007/0128405 A1   Jun. 7, 2007

(30) Foreign Application Priority Data

Nov. 18, 2005  (JP) ................................. 2005-334782
Aug. 24, 2006  (WO) .................. PCT/JP2006/316636

(51) Int. Cl.
*B32B 3/12* (2006.01)
*B01D 39/06* (2006.01)
*B28B 1/00* (2006.01)
(52) U.S. Cl. ........................... 428/116; 55/523; 264/630
(58) Field of Classification Search ........................ None
See application file for complete search history.

(56) References Cited

U.S. PATENT DOCUMENTS

| | | | |
|---|---|---|---|
| 4,102,980 A | 7/1978 | Sasaki et al. | |
| 4,335,023 A | 6/1982 | Dettling et al. | |
| 5,254,797 A | 10/1993 | Imoto et al. | |
| 5,914,187 A | 6/1999 | Naruse et al. | |
| 5,952,079 A * | 9/1999 | Andou et al. | 428/116 |
| 6,060,148 A | 5/2000 | Matsubara et al. | |
| 6,159,431 A | 12/2000 | Inoue et al. | |
| 6,287,103 B1 | 9/2001 | Miyazaki | |
| 6,669,751 B1 * | 12/2003 | Ohno et al. | 55/523 |
| 7,284,980 B2 | 10/2007 | Saijo et al. | |
| 2002/0108360 A1 | 8/2002 | Ishihara et al. | |

(Continued)

FOREIGN PATENT DOCUMENTS

EP   1 384 507 A2   1/2004
(Continued)

OTHER PUBLICATIONS

U.S. Appl. No. 11/711,021.
(Continued)

*Primary Examiner* — Gordon R Baldwin
(74) *Attorney, Agent, or Firm* — Finnegan, Henderson, Farabow, Garrett, and Dunner LLP

(57) ABSTRACT

A honeycomb structured body in which a plurality of porous ceramic members are combined with one another by interposing an adhesive layer, each of the porous ceramic members having a plurality of cells placed in parallel with one another in a longitudinal direction with a cell wall therebetween and having an outer edge wall on the outer edge surface thereof, wherein each of the porous ceramic members has a filling body which is provided so as to fill in at least one corner portion of at least one outermost cell of the porous ceramic members, a cross-sectional shape of the outermost cell at the face orthogonal to the longitudinal direction of the cells is an almost tetragon, and a cross-sectional shape of the filling body at the face orthogonal to the longitudinal direction of the cells is an almost right triangle.

87 Claims, 4 Drawing Sheets

U.S. PATENT DOCUMENTS

| | | |
|---|---|---|
| 2004/0055265 A1 | 3/2004 | Ohno et al. |
| 2004/0137194 A1 | 7/2004 | Fukao et al. |
| 2004/0142145 A1 | 7/2004 | Hashimoto et al. |
| 2004/0161596 A1 | 8/2004 | Taoka et al. |
| 2005/0076626 A1 | 4/2005 | Kudo et al. |
| 2005/0109023 A1 | 5/2005 | Kudo et al. |
| 2005/0153099 A1 | 7/2005 | Yamada |
| 2005/0160710 A1 | 7/2005 | Taoka et al. |
| 2005/0161849 A1 | 7/2005 | Ohno et al. |
| 2005/0169819 A1 | 8/2005 | Shibata |
| 2005/0175514 A1 | 8/2005 | Ohno |
| 2005/0178098 A1 | 8/2005 | Ono et al. |
| 2005/0180898 A1 | 8/2005 | Yamada |
| 2005/0191461 A1 | 9/2005 | Kasai et al. |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0019061 A1 | 1/2006 | Oshimi |
| 2006/0021310 A1 | 2/2006 | Ohno et al. |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0154021 A1 | 7/2006 | Ohno et al. |
| 2006/0166820 A1 | 7/2006 | Ogyu et al. |
| 2006/0172113 A1 | 8/2006 | Kunieda |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0245465 A1 | 11/2006 | Saijo et al. |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0065348 A1 | 3/2007 | Ohno et al. |
| 2007/0085233 A1 | 4/2007 | Yamada |
| 2007/0126160 A1 | 6/2007 | Takahashi |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0202455 A1 | 8/2007 | Saijo et al. |
| 2007/0204580 A1 | 9/2007 | Kunieda |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2008/0006971 A1 | 1/2008 | Kawai et al. |
| 2008/0067725 A1 | 3/2008 | Naruse et al. |
| 2008/0083202 A1 | 4/2008 | Kunieda et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0115597 A1 | 5/2008 | Ohno et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0213485 A1 | 9/2008 | Shibata |
| 2008/0236115 A1 | 10/2008 | Sakashita |
| 2008/0236724 A1 | 10/2008 | Higuchi |
| 2008/0237428 A1 | 10/2008 | Kobayashi et al. |
| 2008/0241015 A1 | 10/2008 | Kudo et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |

FOREIGN PATENT DOCUMENTS

| | | |
|---|---|---|
| EP | 1 493 479 A1 | 1/2005 |
| EP | 1 537 914 A1 | 6/2005 |
| EP | 1 538 133 A1 | 6/2005 |
| JP | 49-113789 | 10/1974 |
| JP | 55-155741 | 12/1980 |
| JP | 56-147637 | 11/1981 |
| JP | 62-234552 | 10/1987 |
| JP | 2-146212 | 6/1990 |
| JP | 7-124428 | 5/1995 |
| JP | 9-299731 | 11/1997 |
| JP | 10-264125 | 10/1998 |
| JP | 10-264274 | 10/1998 |
| JP | 2001-96113 | 4/2001 |
| JP | 2002-46117 | 2/2002 |
| JP | 2003-10616 | 1/2003 |
| JP | 2004-216375 | 8/2004 |
| JP | 2005-270969 | 10/2005 |
| WO | WO 03/080539 A1 | 10/2003 |
| WO | WO 2005/079165 A2 | 9/2005 |

OTHER PUBLICATIONS

U.S. Appl. No. 11/951,949.
U.S. Appl. No. 11/851,300, Yukio Oshimi.
U.S. Appl. No. 11/874,790, Yukio Oshimi.
U.S. Appl. No. 11/925,459, Toshihide Ito.
U.S. Appl. No. 11/927,225, Saito et al.
U.S. Appl. No. 11/932,469, Yukio Oshimi.
Office Action mailed Apr. 28, 2011 in co-pending U.S. Appl. No. 11/600,784.
Office Action dated on Nov. 16, 2011 in co-pending application, U.S. Appl. No. 11/600,784.

* cited by examiner

A-A line cross-sectional view

HONEYCOMB STRUCTURED BODY, METHOD FOR MANUFACTURING HONEYCOMB STRUCTURED BODY AND EXHAUST GAS PURIFYING DEVICE

CROSS-REFERENCE TO RELATED APPLICATIONS

This application claims benefit of priority based on Japanese Patent Application No. 2005-334782 filed on Nov. 18, 2005, and PCT/JP2006/316636, filed on Aug. 24, 2006. The contents of these applications are incorporated herein by reference in their entirety.

BACKGROUND OF THE INVENTION

1. Field of the Invention

The present invention relates to a honeycomb structured body, a method for manufacturing a honeycomb structured body, and an exhaust gas purifying device.

2. Discussion of the Background

Recently, particulate matters (fine particles, hereinafter referred to as PM) such as soot, contained in exhaust gases that are discharged from internal combustion engines for vehicles such as a bus, a truck, construction equipment and the like, have raised problems as contaminants harmful to the environment and the human body.

In order to solve those problems, there have been proposed various applications in which a honeycomb structured body, which comprises a honeycomb unit comprising a plurality of cells longitudinally placed in parallel with one other with a cell wall therebetween, is used as filters for capturing PM in exhaust gases to purify the exhaust gases.

As materials for a conventional honeycomb unit, porous silicon carbide, cordierite or the like is known.

As for examples of the conventionally known honeycomb structured body of this kind, a honeycomb structured body in which each corner portion of all cells are provided with a reinforcing member in order to secure strength against thermal stress (for example, see JP-A 9-299731 and JP-A 49-113789), and a honeycomb structured body in which the thickness of cell walls and the size of each cell are enlarged to secure strength for a backwashing process and also to avoid bridging of PM during the backwashing (for example, see JP-A 2-146212) has been disclosed.

Moreover, a honeycomb structured body in which each corner portion of only the cells located at the outer area are provided with a reinforcing member (for example, see JP-A 10-264125) has been disclosed.

The contents of JP-A 9-299731, JP-A 49-113789, JP-A 2-146212, and JP-A10-264125 are incorporated herein by reference in their entirety.

SUMMARY OF THE INVENTION

A honeycomb structured body of the present invention is a honeycomb structured body in which a plurality of porous ceramic members are combined with one another by interposing an adhesive layer, each of the porous ceramic members having a plurality of cells placed in parallel with one another in a longitudinal direction with a cell wall therebetween and having an outer edge wall on the outer edge surface thereof, wherein each of the porous ceramic members has a filling body which is provided so as to fill in at least one corner portion of at least one outermost cell of the porous ceramic members, a cross-sectional shape of the outermost cell at the face orthogonal to the longitudinal direction of the cells is an almost tetragon, and a cross-sectional shape of the filling body at the face orthogonal to the longitudinal direction of the cells is an almost right triangle.

In the honey comb structured body, desirably, the thickness of the outer edge wall of the porous ceramic members is greater than the thickness of the cell wall, and desirably the thickness of the outer edge wall is at least about 1.3 times and at most about 3.0 times greater than the thickness of the cell wall. Furthermore, the corner portion of the outermost cell provided with the filling body desirably comprises a corner portion constituted by the outer edge wall; and a corner portion constituted by the outer edge wall and the cell wall.

In the honeycomb structured body, desirably, either one of the both end portions of each of the cells is sealed.

Further, at least one outer corner at the outer periphery of the porous ceramic members desirably has a shape of a chamfered corner, and the outer corner in the longitudinal direction of the porous ceramic members desirably has a shape of a chamfered corner.

Moreover, the length of a chamfered portion of the shape of a chamfered corner is desirably at least about 0.3 mm and at most about 2.5 mm in a cross-section perpendicular to the cells. Also, the ratio of the length of a chamfered portion of the shape of a chamfered corner with respect to the length of one side of the porous ceramic members is desirably at least about 0.8% and at most about 7.5%, in a cross-section perpendicular to the cells.

Moreover, the porous ceramic members desirably have an aperture ratio of the cells of about 60% or more at a cross-section perpendicular to the longitudinal direction.

It is desirable that the length of one side of the almost right triangle shape is at least about 5% and at most about 40% of the length of one side of the outermost cell.

The thickness of the cell wall is desirably at least about 0.1 mm and at most about 0.4 mm, and more desirably the thickness of the cell wall is in the range of about 0.2 mm to about 0.3 mm.

Further, desirably, on the honeycomb structured body a catalyst is supported.

The honeycomb structured body of the present invention is a honeycomb structured body in which a plurality of porous ceramic members are combined with one another by interposing an adhesive layer, each of the porous ceramic members having a plurality of cells placed in parallel with one another in a longitudinal direction with a cell wall therebetween and having an outer edge wall on the outer edge surface thereof, wherein the plurality of porous ceramic members comprise at least two kinds of porous ceramic members having different shapes, each of the porous ceramic members has a filling body which is provided so as to fill in at least one corner portion of at least one outermost cell of the porous ceramic members, a cross-sectional shape of the outermost cell at the face orthogonal to the longitudinal direction of the cells is an almost tetragon, and a cross-sectional shape of the filling body at the face orthogonal to the longitudinal direction of the cells is an almost right triangle.

In the honeycomb structured body, desirably, the thickness of the outer edge wall of the porous ceramic members is greater than the thickness of the cell wall, and desirably the thickness of the outer edge wall is at least about 1.3 times and at most about 3.0 times greater than the thickness of the cell wall. Furthermore, the corner portion of the outermost cell provided with the filling body desirably comprises a corner portion constituted by the outer edge wall; and a corner portion constituted by the outer edge wall and the cell wall.

In the honeycomb structured body, desirably, either one of the both end portions of each of the cells is sealed.

Further, at least one outer corner at the outer periphery of the porous ceramic members desirably has a shape of a chamfered corner, and the outer corner in the longitudinal direction of the porous ceramic members desirably has a shape of a chamfered corner.

Moreover, the length of a chamfered portion of the shape of a chamfered corner is desirably at least about 0.3 mm and at most about 2.5 mm in a cross-section perpendicular to the cells. Also, the ratio of the length of a chamfered portion of the shape of a chamfered corner with respect to the length of one side of the porous ceramic members is desirably at least about 0.8% and at most about 7.5%, in a cross-section perpendicular to the cells.

Moreover, the porous ceramic members desirably have an aperture ratio of the cells of about 60% or more at a cross-section perpendicular to the longitudinal direction.

It is desirable that the length of one side of the almost right triangle shape is at least about 5% and at most about 40% of the length of one side of the outermost cell.

The thickness of the cell wall is desirably at least about 0.1 mm and at most about 0.4 mm, and more desirably the thickness of the cell wall is in the range of about 0.2 mm to about 0.3 mm.

Further, desirably, on the honeycomb structured body a catalyst is supported.

The method for manufacturing a honeycomb structured body of the present invention comprises manufacturing a ceramic molded body through extrusion-molding, using a raw material paste containing a ceramic material as a main component, the ceramic molded body having a plurality of cells placed in parallel with one another in the longitudinal direction with a cell wall therebetween;

manufacturing a plurality of porous ceramic members through manufacturing of the porous ceramic members by degreasing and firing the ceramic molded body, each of the porous ceramic members having a plurality of cells placed in parallel with one another in the longitudinal direction with a cell wall therebetween;

manufacturing a porous ceramic member aggregated body by aggregating the plurality of porous ceramic members by interposing an adhesive paste layer; and drying the adhesive paste layer to solidify the adhesive paste layer, wherein upon manufacturing the ceramic molded body, a die is used such that a corner portion of cells having an almost tetragonal shape is formed into a shape that is provided with a filling body having an almost right triangle shape at a cross-section perpendicular to the cells of the ceramic molded body, each of the porous ceramic members has a filling body which is provided so as to fill in at least one corner portion of at least one outermost cell of the porous ceramic members, a cross-sectional shape of the outermost cell at the face orthogonal to the longitudinal direction of the cells of the porous ceramic members is an almost tetragon, and a cross-sectional shape of the filling body at the face orthogonal to the longitudinal direction of the cells of the porous ceramic members is an almost right triangle.

In the method for manufacturing a honeycomb structured body, desirably, the thickness of the outer edge wall of the porous ceramic members is greater than the thickness of the cell wall of said porous ceramic members, and the thickness of the outer edge wall is desirably at least about 1.3 times and at most about 3.0 times greater than the thickness of the cell wall of the porous ceramic members. Furthermore, the corner portion of the outermost cell of said porous ceramic members provided with the filling body desirably comprises a corner portion constituted by the outer edge wall; and a corner portion constituted by the outer edge wall and the cell wall of said porous ceramic members.

The method for manufacturing a honeycomb structured body desirably further comprises sealing the cells by filling a plug material paste into either one of the both end portions of each of the cells of the ceramic molded body, after manufacturing the ceramic molded body.

Desirably, the method for manufacturing a honeycomb structured body further comprises forming a shape of a chamfered corner on at least one outer corner at the outer periphery of the porous ceramic members. Further, the method for manufacturing a honeycomb structured body comprises forming a shape of a chamfered corner on the outer corner in the longitudinal direction of the porous ceramic members.

Moreover, the length of a chamfered portion of the shape of a chamfered corner is desirably at least about 0.3 mm and at most about 2.5 mm in a cross-section perpendicular to the cells of the porous ceramic members. Also, the ratio of the length of a chamfered portion of the shape of a chamfered corner with respect to the length of one side of the porous ceramic members is desirably at least about 0.8% and at most about 7.5%, in a cross-section perpendicular to the cells of the porous ceramic members.

Moreover, the porous ceramic members desirably have an aperture ratio of the cells of about 60% or more at a cross-section perpendicular to the longitudinal direction.

It is desirable that the length of one side of the almost right triangle is at least about 5% and at most about 40% of the length of one side of the outermost cell of the porous ceramic members.

The thickness of the cell wall of the porous ceramic members is desirably at least about 0.1 mm and at most about 0.4 mm, and more desirably the thickness of the cell wall of the porous ceramic members is in the range of about 0.2 mm to about 0.3 mm.

Desirably, the method for manufacturing a honeycomb structured body further comprises supporting a catalyst on the porous ceramic members after firing the ceramic molded body or after drying the adhesive paste layer to solidify the adhesive paste layer in the manufacturing of the porous ceramic members.

Desirably, the method for manufacturing a honeycomb structured body further comprises manufacturing a ceramic block by drying the adhesive paste layer to solidify the adhesive paste layer, the ceramic block comprising a plurality of porous ceramic members that are combined with one another by interposing an adhesive layer; and forming a sealing material layer on the peripheral portion of the ceramic block.

The method for manufacturing a honeycomb structured body of the present invention comprises manufacturing a ceramic molded body through extrusion-molding, using a raw material paste containing a ceramic material as a main component, the ceramic molded body having a plurality of cells placed in parallel with one another in the longitudinal direction with a cell wall therebetween;

manufacturing a plurality of porous ceramic members through manufacturing of the porous ceramic members by degreasing and firing the ceramic molded body, each of the porous ceramic members having a plurality of cells placed in parallel with one another in the longitudinal direction with a cell wall therebetween;

manufacturing a porous ceramic member aggregated body by aggregating the plurality of porous ceramic members by interposing an adhesive paste layer; and drying the adhesive paste layer to solidify the adhesive paste layer, wherein upon manufacturing the porous ceramic member aggregated body, at least two kinds of porous ceramic members having different shapes are aggregated, each of the porous ceramic members has a filling body which is provided so as to fill in at least one corner portion of at least one outermost cell of the porous ceramic members, a cross-sectional shape of the outermost cell at the face orthogonal to the longitudinal direction of the cells of the porous ceramic members is an almost tetragon, and a cross-sectional shape of the filling body at the face orthogonal to the longitudinal direction of the cells of the porous ceramic members is an almost right triangle.

In the method for manufacturing a honeycomb structured body, desirably, the thickness of the outer edge wall of the porous ceramic members is greater than the thickness of the cell wall of said porous ceramic members, and the thickness of the outer edge wall is desirably at least about 1.3 times and at most about 3.0 times greater than the thickness of the cell wall of the porous ceramic members. Furthermore, the corner portion of the outermost cell of said porous ceramic members provided with the filling body desirably comprises a corner portion constituted by the outer edge wall; and a corner portion constituted by the outer edge wall and the cell wall of said porous ceramic members.

The method for manufacturing a honeycomb structured body desirably further comprises sealing the cells by filling a plug material paste into either one of the both end portions of each of the cells of the ceramic molded body, after manufacturing the ceramic molded body.

Desirably, the method for manufacturing a honeycomb structured body further comprises forming a shape of a chamfered corner on at least one outer corner at the outer periphery of the porous ceramic members. Further, the method for manufacturing a honeycomb structured body comprises forming a shape of a chamfered corner on the outer corner in the longitudinal direction of the porous ceramic members.

Moreover, the length of a chamfered portion of the shape of a chamfered corner is desirably at least about 0.3 mm and at most about 2.5 mm in a cross-section perpendicular to the cells of the porous ceramic members. Also, the ratio of the length of a chamfered portion of the shape of a chamfered corner with respect to the length of one side of the porous ceramic members is desirably at least about 0.8% and at most about 7.5%, in a cross-section perpendicular to the cells of the porous ceramic members.

Moreover, the porous ceramic members desirably have an aperture ratio of the cells of about 60% or more at across-section perpendicular to the longitudinal direction.

It is desirable that the length of one side of the almost right triangle is at least about 5% and at most about 40% of the length of one side of the outermost cell of the porous ceramic members.

The thickness of the cell wall of the porous ceramic members is desirably at least about 0.1 mm and at most about 0.4 mm, and more desirably the thickness of the cell wall of the porous ceramic members is in the range of about 0.2 mm to about 0.3 mm.

Desirably, the method for manufacturing a honeycomb structured body further comprises supporting a catalyst on the porous ceramic members after firing the ceramic molded body or after drying the adhesive paste layer to solidify the adhesive paste layer in the manufacturing of the porous ceramic members.

Desirably, the method for manufacturing a honeycomb structured body further comprises manufacturing a ceramic block by drying the adhesive paste layer to solidify the adhesive paste layer, the ceramic block comprising a plurality of porous ceramic members that are combined with one another by interposing an adhesive layer; and forming a sealing material layer on the peripheral portion of the ceramic block.

The method for manufacturing a honeycomb structured body of the present invention comprises manufacturing a ceramic molded body through extrusion-molding, using a raw material paste containing a ceramic material as a main component, the ceramic molded body having a plurality of cells placed in parallel with one another in the longitudinal direction with a cell wall therebetween;

manufacturing a plurality of porous ceramic members through manufacturing of the porous ceramic members by degreasing and firing the ceramic molded body, each of the porous ceramic members having a plurality of cells placed in parallel with one another in the longitudinal direction with a cell wall therebetween;

manufacturing a porous ceramic member aggregated body by aggregating the plurality of porous ceramic members by interposing an adhesive paste layer; and drying the adhesive paste layer to solidify the adhesive paste layer, wherein in the manufacturing of the porous ceramic members, a filling body is formed after manufacturing of the ceramic molded body, the filling body provided so as to fill in at least one corner portion of at least one outermost cell of each of the porous ceramic members, a cross-sectional shape of the outermost cell at the face orthogonal to the longitudinal direction of the cells of the porous ceramic members is an almost tetragon, and a cross-sectional shape of the filling body at the face orthogonal to the longitudinal direction of the cells of the porous ceramic members is an almost right triangle.

In the method for manufacturing a honeycomb structured body, desirably, the thickness of the outer edge wall of the porous ceramic members is greater than the thickness of the cell wall of the porous ceramic members, and the thickness of the outer edge wall is desirably at least about 1.3 times and at most about 3.0 times greater than the thickness of the cell wall of the porous ceramic members. Furthermore, the corner portion of the outermost cell of the porous ceramic members provided with the filling body desirably comprises a corner portion constituted by the outer edge wall; and a corner portion constituted by the outer edge wall and the cell wall of the porous ceramic members.

The method for manufacturing a honeycomb structured body desirably further comprises sealing the cells by filling a plug material paste into either one of the both end portions of each of the cells of the ceramic molded body, after manufacturing the ceramic molded body.

Desirably, the method for manufacturing a honeycomb structured body further comprises forming a shape of a chamfered corner on at least one outer corner at the outer periphery of the porous ceramic members. Further, the method for manufacturing a honeycomb structured body comprises forming a shape of a chamfered corner on the outer corner in the longitudinal direction of the porous ceramic members.

Moreover, the length of a chamfered portion of the shape of a chamfered corner is desirably at least about 0.3 mm and at most about 2.5 mm in a cross-section perpendicular to the cells of the porous ceramic members. Also, the ratio of the length of a chamfered portion of the shape of a chamfered corner with respect to the length of one side of the porous ceramic members is desirably at least about 0.8% and at most about 7.5%, in a cross-section perpendicular to the cells of the porous ceramic members.

Moreover, the porous ceramic members desirably have an aperture ratio of the cells of about 60% or more at a cross-section perpendicular to the longitudinal direction.

It is desirable that the length of one side of the almost right triangle is at least about 5% and at most about 40% of the length of one side of the outermost cell of the porous ceramic members.

The thickness of the cell wall of the porous ceramic members is desirably at least about 0.1 mm and at most about 0.4 mm, and more desirably the thickness of the cell wall of the porous ceramic members is in the range of about 0.2 mm to about 0.3 mm.

Desirably, the method for manufacturing a honeycomb structured body further comprises supporting a catalyst on the porous ceramic members after firing the ceramic molded body or after drying the adhesive paste layer to solidify the adhesive paste layer in the manufacturing of the porous ceramic members.

Desirably, the method for manufacturing a honeycomb structured body further comprises manufacturing a ceramic block by drying the adhesive paste layer to solidify the adhesive paste layer, the ceramic block comprising a plurality of porous ceramic members that are combined with one another by interposing an adhesive layer; and forming a sealing material layer on the peripheral portion of the ceramic block.

The exhaust gas purifying device of the present invention comprises a honeycomb structured body in which a plurality of porous ceramic members are combined with one another by interposing an adhesive layer, each of the porous ceramic members having a plurality of cells placed in parallel with one another in a longitudinal direction with a cell wall therebetween and having an outer edge wall on the outer edge surface thereof;

a casing that covers the periphery of the honeycomb structured body; and a holding sealing material that is placed between the honeycomb structured body and the casing, one end of the casing at an exhaust gas inlet side being connected to an introducing pipe that is connected to an internal combustion system, the other end of the casing being connected to an exhaust pipe that is connected to the outside, wherein each of the porous ceramic members has a filling body which is provided so as to fill in at least one corner portion of at least one outermost cell of the porous ceramic members, a cross-sectional shape of the outermost cell at the face orthogonal to the longitudinal direction of the cells is an almost tetragon, and a cross-sectional shape of the filling body at the face orthogonal to the longitudinal direction of the cells is an almost right triangle.

In the exhaust gas purifying device, desirably, the thickness of the outer edge wall of the porous ceramic members is greater than the thickness of the cell wall, and desirably the thickness of the outer edge wall is at least about 1.3 times and at most about 3.0 times greater than the thickness of the cell wall. Furthermore, the corner portion of the outermost cell provided with the filling body desirably comprises a corner portion constituted by the outer edge wall; and a corner portion constituted by the outer edge wall and the cell wall.

In the exhaust gas purifying device, desirably, either one of the both end portions of each of the cells is sealed.

Further, at least one outer corner at the outer periphery of the porous ceramic members desirably has a shape of a chamfered corner, and the outer corner in the longitudinal direction of the porous ceramic members desirably has a shape of a chamfered corner.

Moreover, the length of a chamfered portion of the shape of a chamfered corner is desirably at least about 0.3 mm and at most about 2.5 mm in a cross-section perpendicular to the cells. Also, the ratio of the length of a chamfered portion of the shape of a chamfered corner with respect to the length of one side of the porous ceramic members is desirably at least about 0.8% and at most about 7.5%, in a cross-section perpendicular to the cells.

Moreover, the porous ceramic members desirably have an aperture ratio of the cells of about 60% or more at a cross-section perpendicular to the longitudinal direction.

It is desirable that the length of one side of the almost right triangle shape is at least about 5% and at most about 40% of the length of one side of the outermost cell.

The thickness of the cell wall is desirably at least about 0.1 mm and at most about 0.4 mm, and more desirably the thickness of the cell wall is in the range of about 0.2 mm to about 0.3 mm.

Further, desirably, on the honeycomb structured body of the exhaust gas purifying device, a catalyst is supported.

The exhaust gas purifying device of the present invention comprises a honeycomb structured body in which a plurality of porous ceramic members are combined with one another by interposing an adhesive layer, each of the porous ceramic members having a plurality of cells placed in parallel with one another in a longitudinal direction with a cell wall therebetween and having an outer edge wall on the outer edge surface thereof;

a casing that covers the periphery of the honeycomb structured body; and a holding sealing material that is placed between the honeycomb structured body and the casing, one end of the casing at an exhaust gas inlet side being connected to an introducing pipe that is connected to an internal combustion system, the other end of the casing being connected to an exhaust pipe that is connected to the outside, wherein the plurality of porous ceramic members comprise at least two kinds of porous ceramic members having different shapes, each of the porous ceramic members has a filling body which is provided so as to fill in at least one corner portion of at least one outermost cell of the porous ceramic members, a cross-sectional shape of the outermost cell at the face orthogonal to the longitudinal direction of the cells is an almost tetragon, and a cross-sectional shape of the filling body at the face orthogonal to the longitudinal direction of the cells is an almost right triangle.

In the exhaust gas purifying device, desirably, the thickness of the outer edge wall of the porous ceramic members is greater than the thickness of the cell wall, and desirably the thickness of the outer edge wall is at least about 1.3 times and at most about 3.0 times greater than the thickness of the cell wall. Furthermore, the corner portion of the outermost cell provided with the filling body desirably comprises a corner portion constituted by the outer edge wall; and a corner portion constituted by the outer edge wall and the cell wall.

In the exhaust gas purifying device, desirably, either one of the both end portions of each of the cells is sealed.

Further, at least one outer corner at the outer periphery of the porous ceramic members desirably has a shape of a chamfered corner, and the outer corner in the longitudinal direction of the porous ceramic members desirably has a shape of a chamfered corner.

Moreover, the length of a chamfered portion of the shape of a chamfered corner is desirably at least about 0.3 mm and at most about 2.5 mm in a cross-section perpendicular to the cells. Also, the ratio of the length of a chamfered portion of the shape of a chamfered corner with respect to the length of one side of the porous ceramic members is desirably at least about 0.8% and at most about 7.5%, in a cross-section perpendicular to the cells.

Moreover, the porous ceramic members desirably have an aperture ratio of the cells of about 60% or more at a cross-section perpendicular to the longitudinal direction.

It is desirable that the length of one side of the almost right triangle shape is at least about 5% and at most about 40% of the length of one side of the outermost cell.

The thickness of the cell wall is desirably at least about 0.1 mm and at most about 0.4 mm, and more desirably the thickness of the cell wall is in the range of about 0.2 mm to about 0.3 mm.

Further, desirably, on the honeycomb structured body of the exhaust gas purifying device, a catalyst is supported.

DESCRIPTION OF THE EMBODIMENTS

The honeycomb structured body according to the embodiments of the present invention is a honeycomb structured body in which a plurality of porous ceramic members are combined with one another by interposing an adhesive layer, each of the porous ceramic members having a plurality of cells placed in parallel with one another in a longitudinal direction with a cell wall therebetween and having an outer edge wall on the outer edge surface thereof, wherein each of the porous ceramic members has a filling body which is provided so as to fill in at least one corner portion of at least one outermost cell of the porous ceramic members, a cross-sectional shape of the outermost cell at the face orthogonal to the longitudinal direction of the cells is an almost tetragon, and a cross-sectional shape of the filling body at the face orthogonal to the longitudinal direction of the cells is an almost right triangle.

Referring to the figures, the honeycombs structured body according to the embodiments of the present invention will be described below.

Figure 1:
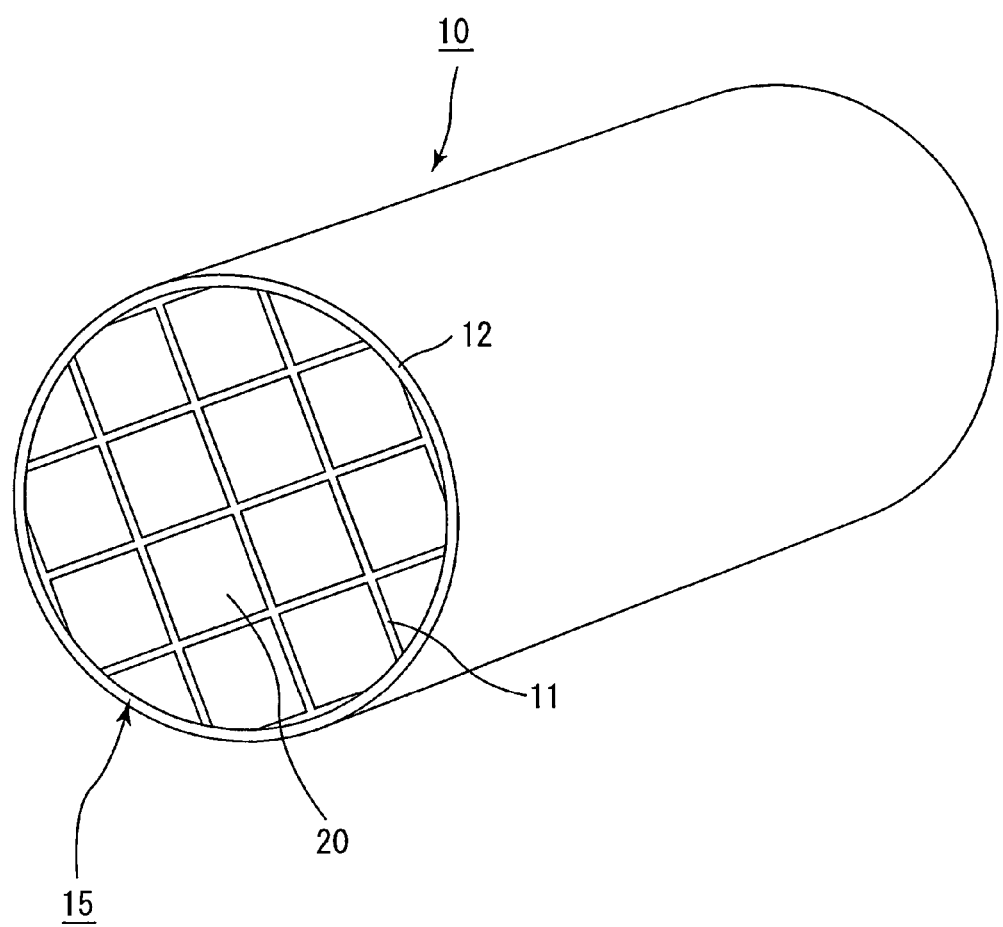
FIG. 1 is a perspective view that schematically shows one example of the honeycomb structured body according to an embodiment of the present invention.
Figure 2A:
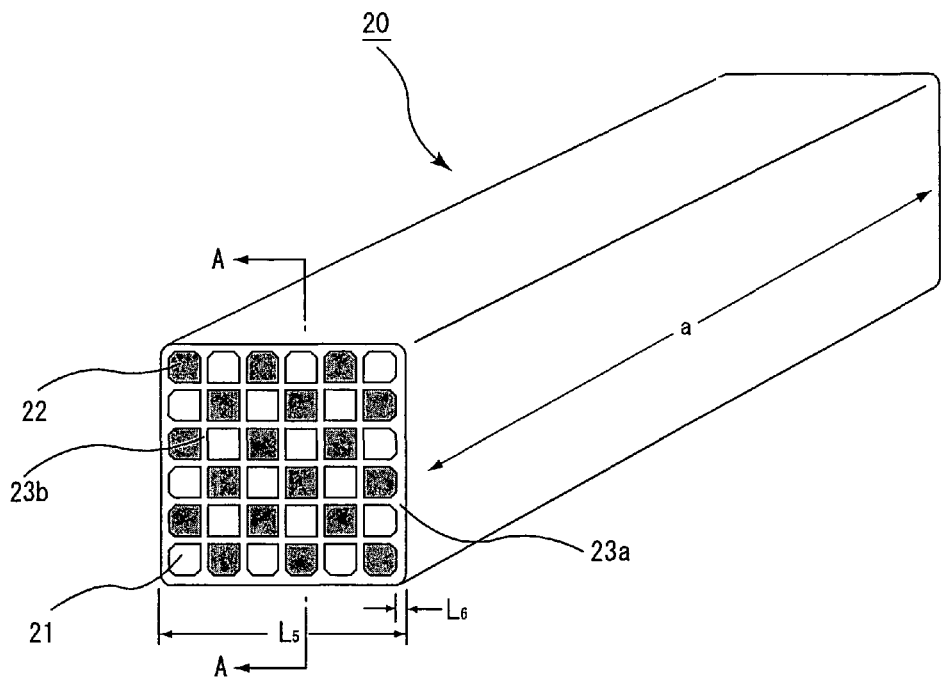
FIG. 2A is a perspective view showing one example of a porous ceramic member which constitutes the honeycomb structured body according to an embodiment of the present invention.

FIG. 1 is a perspective view that schematically shows one example of the honeycomb structured body according to an embodiment of the present invention; FIG. 2A is a perspective view showing one example of a porous ceramic member which constitutes the honeycomb structured body according to an embodiment of the present invention shown in FIG. 1, and FIG. 2B is a cross-sectional view taken along line A-A of the porous ceramic member shown in FIG. 2A.

As shown in FIG. 1, in a honeycomb structured body 10, a plurality of porous ceramic members 20 comprising silicon carbide based ceramics and the like are combined with one another by interposing a sealing material layer (adhesive layer) 11 to form a cylindrical ceramic block 15, and a sealing material layer (coating layer) 12 is formed on the periphery of the ceramic block 15.

With respect to the honeycomb structured body 10 shown in FIG. 1, although the shape of the ceramic block is a cylindrical shape, the shape of the ceramic block of the present invention is not limited to the cylindrical shape as long as it has a shape of a pillar, and may be, for example, a cylindroid shape, a rectangular pillar shape or the like, and also may be any other shape.

Figure 2B:
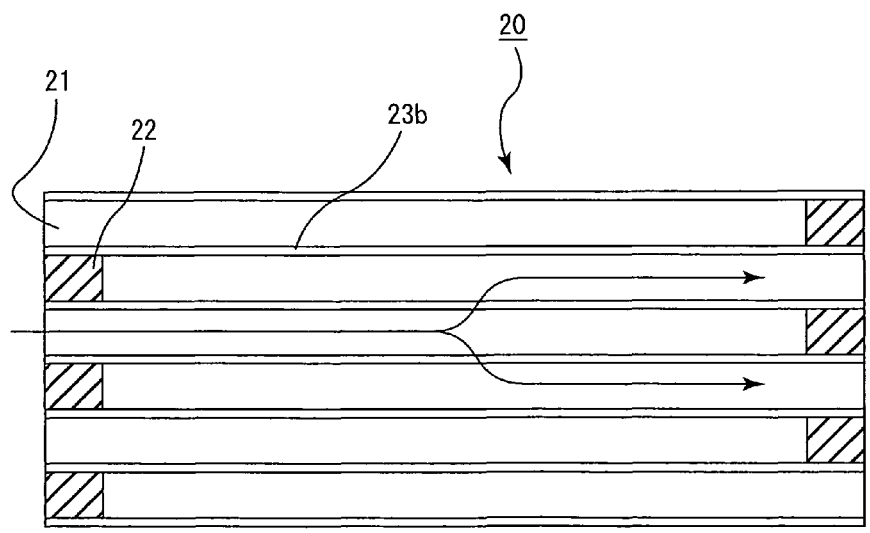
FIG. 2B is a cross-sectional view taken along line A-A of FIG. 2A.

As shown in FIGS. 2A and 2B, in the porous ceramic member 20, a honeycomb unit comprises a plurality of cells 21 placed in parallel with one another in the longitudinal direction (the direction shown by an arrow a in FIG. 2A) with a cell wall 23b therebetween as well as an outer edge wall 23a formed on the outer edge surface, and in this honeycomb unit, either of the end portions of the cells 21 is sealed with a plug 22 so that cell walls 23b that separate the cells 21 are allowed to function as filters. In other words, each of the cells 21 formed in the porous ceramic member 20 has either one of the end portions on the inlet side or the outlet side of exhaust gases sealed with the plug 22 as shown in FIG. 2B so that exhaust gases that have flowed into one of the cells 21 are allowed to flow out of another cell 21 after surely having passed through a cell wall 23b that separates the cells 21.

Figure 3:
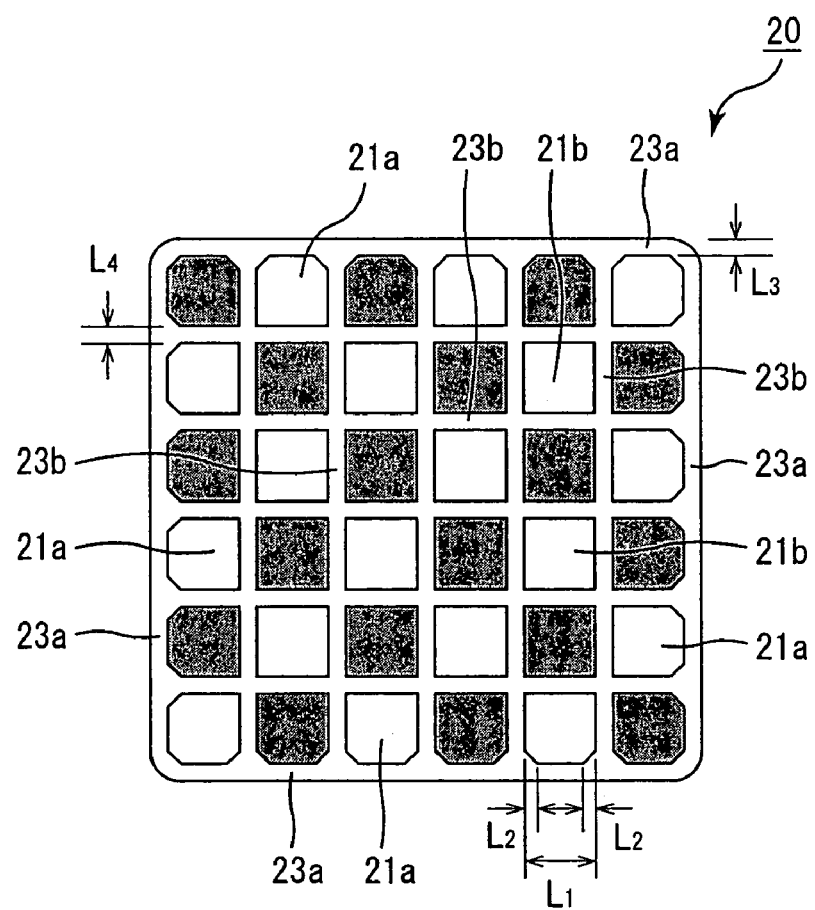
FIG. 3 is a front view that schematically shows an end face of one example of the porous ceramic member shown in FIG. 2.

FIG. 3 is a front view that shows an enlarged view of only an end face of one example of the porous ceramic member shown in FIG. 2A.

As shown in FIG. 3, a filling body having a cross-sectional shape of a right triangle is provided at the corner portion of the outermost cell 21a having a tetragonal cross-section of the porous ceramic member 20. The corner portion provided with the filling body comprises a corner portion constituted by the outer edge wall 23a, and a corner portion constituted by the outer edge wall 23a and the cell wall 23b.

As described above, by forming a filling body having a cross-sectional shape of a right triangle at the corner portion of the outermost cell 21a having a tetragonal cross-section of the porous ceramic member, it becomes easier to secure the strength of the porous ceramic member, and further becomes possible to secure the aperture ratio without reducing the thickness of the cell wall; therefore, it becomes possible to keep the pressure loss at a low level, and damages such as cracks and the like can be prevented more easily from occurring.

In particular, the right triangle is desirably an isosceles right triangle because with this shape, the shape of the filling body becomes symmetrical across the corner portion, and the weight balance and the balance of thermal conductivity around the corner portion tend to become excellent, and therefore it becomes possible to efficiently disperse heat and stress applied to the porous ceramic member.

Here, the porous ceramic member shown in FIG. 3 is provided with a filling body having a cross-sectional shape of a right triangle at predetermined corner portions of the outermost cells 21a that have a tetragonal cross-section, and the rest of the cells 21b have a tetragon shape; however, the porous ceramic member 20 constituting the honeycomb structured body 10 of the present invention may be provided with a filling body having a cross-sectional shape of a right triangle at all the corner portions of the outermost cells 21a that have a tetragonal cross-section, and the rest of the cells 21b having a tetragonal shape may also be provided with the filling body having a cross-sectional shape of a right triangle at a portion of or all of its corner portions.

In the outermost cell 21a, the length ($L_2$ in FIG. 3) of one side of the filling body having a right triangle shape is desirably at least about 5% and at most about 40% of the length ($L_1$ in FIG. 3) of one side of the outermost cell 21a having a tetragonal shape.

The length $L_2$ of about 5% or more may prevent the case in which effects of forming filling bodies can not be enjoyed, whereas the length $L_2$ of about 40% or less tends to prevent the outermost cells from becoming too small.

For example, when the length of one side of the outermost cell 21a before providing the filling body is about 1.2 mm, the length $L_2$ of one side of the filling body having a right triangle shape is desirably at least about 0.06 mm and at most about 0.48 mm.

The porous ceramic member 20 may have a thickness ($L_3$ in FIG. 3) of the outer edge wall 23a greater than the thickness ($L_4$ in FIG. 3) of the cell wall 23b in the cross-section perpendicular to the longitudinal direction. In FIG. 3, the cell wall 23b refers to all the cell walls except the outer edge wall 23a.

The thickness $L_3$ of the outer edge wall 23a is not necessarily greater than the thickness $L_4$ of the cell wall 23b; however, such an arrangement is desirable because a high aperture ratio can be maintained and improved strength can also be secured more easily, and for example, damages such as chips caused from the porous ceramic members contacting each other can more than ever and easily be prevented from occurring.

The thickness $L_3$ of the outer edge wall 23a is desirably at least about 1.3 times and at most about 3.0 times greater than the thickness $L_4$ of the cell wall 23b.

The thickness $L_3$ of about 1.3 times or more the thickness of the thickness $L_4$ may have difficulty in preventing the porous ceramic member from enjoying the effects of securing strength, and the thickness $L_3$ about 3.0 times or less the thickness of the thickness $L_4$ tends to prevent damages such as cracks in the cell walls at the center portion since it tends to become unnecessary to lower the thickness of the cell walls at the center portion in order to secure the aperture ratio.

The lower limit value of the thickness $L_4$ of the cell wall 23b is desirably about 0.1 mm and the upper limit value thereof is desirably about 0.4 mm.

With the thickness $L_4$ of the cell wall 23b of about 0.1 mm or more, the strength of the cell wall 23b is prevented from becoming too low to cause damages such as cracks, whereas the thickness $L_4$ of the cell wall 23b of about 0.4 mm or less makes it easier to maintain a high aperture ratio, and resultantly prevent the pressure loss to become too high.

The thickness $L_4$ of the cell wall 23b more desirably has a lower limit value of about 0.2 mm and an upper limit value of about 0.3 mm.

In the porous ceramic member 20, either one end portion of the two end portions of each of the cells 21 is sealed with a plug 22; however, in the honeycomb structured body according to the embodiments of the present invention, an end portion of each of the cells in the porous ceramic member is not necessarily sealed, and the end portion may be sealed depending on the use of the honeycomb structured body.

Specifically, for example, when the honeycomb structured body according to the embodiments of the present invention is used as DPF (Diesel Particulate Filter), an end portion of the cell is desirably sealed, whereas the honeycomb structured body according to the above-mentioned embodiments used as a catalyst supporting carrier is not necessarily sealed at the end portion of the cell.

According to the honeycomb structured body in accordance with the embodiments of the present invention, among the outermost cells, it is satisfactory if there is at least one outer most cell provided with a filling body on at least one corner portion thereof; however, the number of such cells is desirably as large as possible, and it is more desirable if all the outermost cells are provided with the filling body on at least one corner portion thereof.

The porous ceramic member 20 constituting the honeycomb structured body according to the embodiments of the present invention desirably has at least one outer corner that has a shape of a chamfered corner.

The outer corner of the porous ceramic member 20 having a shape of a chamfered corner makes it more difficult for cracks to be generated. The reason for this has not been made clear, but in the honeycomb structured body according to the embodiments of the present invention, the reason is presumably because the stress imposed on the porous ceramic member 20 can be made smaller more easily due to the shape of its outer corner (i.e., a shape of a chamfered corner), compared to the case in which the outer corner is a sharp corner, thereby making it difficult for cracks to be generated.

In the present specification, the phrase "a shape of a chamfered corner" refers to a shape in which a diagonal surface including flat and curved surfaces is formed at a corner made by the intersection of two surfaces.

In the honeycomb structured body according to the embodiments of the present invention, it is desirable that at least one outer corner of the porous ceramic member 20 has a shape of a chamfered corner; however, the more outer corners having the shape of a chamfered corner there are the more preferable, and it is most desirable when all of the outer corners in the longitudinal direction of the porous ceramic member 20 have the shape of a chamfered corner, as shown in FIG. 2A.

The shape of the chamfered corner is not particularly limited and may be a shape of a chamfered corner in which the chamfered portion is a flat surface (a shape of a C-chamfered corner), or a shape of a chamfered corner in which the chamfered portion is a curved surface; however, the shape of a chamfered corner in which the chamfered portion is a curved surface is desirably applied, due to the fact that it is superior in stress relaxation properties and particularly, it is more desirable to employ a shape of a R-chamfered corner in which the shape of the cross-section perpendicular to the cells forms an arc (see FIG. 2A).

The lower limit value of a length $L_6$ of the chamfered portion in the cross-section perpendicular to the cells is desirably about 0.3 mm, and the upper limit value thereof is desirably about 2.5 mm. The lower limit value is more desirably set to about 0.5 mm and the upper limit value is more desirably set to about 1.5 mm. In the cross-section perpendicular to the cells, the lower limit of the ratio of the length $L_6$ of the chamfered portion with respect to a length $L_5$ of one side of the porous ceramic member 20 is desirably about 0.8%, and the upper limit thereof is desirably about 7.5%. More desirably, the lower limit is set to about 2.5% and the upper limit is set to about 6% (see FIG. 2A).

According to the honeycomb structured body in accordance with the embodiments of the present invention, in the porous ceramic member 20, the aperture ratio of the cells at a cross-section perpendicular to the longitudinal direction is desirably set to about 60% or more.

The aperture ratio of about 60% or more may prevent the pressure loss in the honeycomb structured body from increasing.

The more desirable lower limit value is about 63% and the most desirable lower limit value is about 65%.

The aperture ratio of the cells used here means the ratio occupied by cells in a cross-section perpendicular to the longitudinal direction of the porous ceramic member 20. The above-mentioned perpendicular cross-section refers to a cross-section that is not sealed by a plug.

The porous ceramic member is mainly made of porous ceramics, and examples of the material include nitride ceramics such as aluminum nitride, silicon nitride, boron nitride and titanium nitride; carbide ceramics such as silicon carbide, zirconium carbide, titanium carbide, tantalum carbide and tungsten carbide; and oxide ceramics such as alumina, zirconia, cordierite, mullite, silica and aluminum titanate, and the like. Here, the porous ceramic member may be formed as a composite body of silicon and silicon carbide. In the case where the composite body of silicon and silicon carbide is used, silicon is desirably added thereto to make up to at least about 0% by weight and at most about 45% by weight of the entire body.

With respect to the material of the porous ceramic member, a silicon carbide based ceramic which is superior in heat resistance and mechanical characteristics, and in addition, has a high thermal conductivity, is desirably used. Here, the silicon carbide based ceramic refers to a material having a silicon carbide content of about 60% by weight or more.

With respect to the average pore diameter of the porous ceramic member, although not particularly limited, the lower limit value is desirably set to about 1 μm, and the upper limit value is desirably set to about 50 μm. More desirably, the lower limit value is set to about 5 μm, and the upper limit value is set to about 30 μm. The average pore diameter of about 1 μm or more tends to prevent the pressure loss from becoming high, whereas the average pore diameter of about 50 μm or less prevents PM from easily passing through the pores, so that the PM are surely captured and the capture efficiency of PM may be prevented from being deteriorated more easily.

With respect to the porosity of the porous ceramic member, although not particularly limited, the lower limit thereof is desirably set to about 40%, and the upper limit thereof is desirably set to about 70%. The more desirable lower limit is about 45% and the more desirable upper limit is about 60%. The porosity of about 40% or more tends to prevent the pores of the honeycomb structured body from being clogged, whereas the porosity about 70% or less may prevent the strength of the honeycomb structured body from deteriorating so that it can be prevented from being destroyed easily.

Here, the porosity can be measured through known methods such as a mercury injection method, Archimedes method and a measuring method using a scanning electron microscope (SEM)

The area of a cross-section perpendicular to the longitudinal direction of the porous ceramic member is not particularly limited, but normally the cross-section with the area of at least about 5 cm$^2$ and at most about 50 cm$^2$ is desirably used.

The area of about 5 cm$^2$ or more makes it difficult to reduce an effective filtration area as filter, whereas the area about 50 cm$^2$ or less tends to prevent damage such as cracks due to thermal stress from generating upon production and in use.

The plug 22 that seals the end portion of the porous ceramic member and the cell wall 23b (outer edge wall 23a) are desirably made from the same porous ceramic material. With this arrangement, the contact strength between the two members tend to increase, and moreover, by adjusting the porosity of the plug 22 in the same manner as the cell walls 23b (outer edge walls 23a), it becomes possible to properly adjust the coefficient of thermal expansion of the cell walls 23b (outer edge walls 23a) and the coefficient of thermal expansion of the plug 22 so that it becomes easier to prevent a gap from being generated between the plug 22 and the cell walls 23b (outer edge walls 23a) due to a thermal stress upon production and in use and also to prevent cracks from occurring in the plug 22 and in portions of the cell walls 23b (outer edge walls 23a) that are made in contact with the plug 22.

With respect to the length of the plug 22, although not particularly limited, in the case where the plug 22 is made from porous silicon carbide, for example, the lower limit value is desirably set to about 1 mm, whereas the upper limit value is desirably set to about 20 mm.

The length of the plug of about 1 mm or more may enable a more secure sealing of the end portion of the cells more easily, whereas the length of the plug about 20 mm or less tends to prevent the effective filtration area of the honeycomb structured body from being deteriorated.

More desirably, the lower limit value of the length of the plug is about 2 mm and the upper limit value thereof is about 10 mm.

In the honeycomb structured body 10, the sealing material layer (adhesive layer) 11 is formed between the porous ceramic members 20, allowing to have a function that prevents leakage of exhaust gases, and also functions as a bonding material used for binding a plurality of the porous ceramic members 20 to one another. On the other hand, the sealing material layer (coat layer) 12, which is formed on the peripheral face of the ceramic block 15, is also allowed to function as a plug used for preventing exhaust gases passing through the cells from leaking from the peripheral face of the ceramic block 15 when the honeycomb structured body 10 is placed in an exhaust passage of an internal combustion engine, and is also allowed to function as an reinforcing member used for adjusting the external shape of the ceramic block 15 as well as strengthening the peripheral portion of the ceramic block 15.

Here, in the honeycomb structured body 10, the adhesive layer 11 and the coat layer 12 may be formed by using the same material, or may be formed by using different materials. In the case where the adhesive layer 11 and the coat layer 12 are made from the same material, the compounding ratio of the materials may be the same or may be different. Moreover, the material may have either a dense structure or a porous structure.

Examples of the material used for forming the adhesive layer 11 and the coat layer 12 include, although not particularly limited, a material made from inorganic fibers and/or inorganic particles in addition to an inorganic binder and an organic binder.

Examples of the above-mentioned inorganic binder include silica sol, alumina sol and the like. Each of these materials may be used alone, or two or more kinds of these may be used in combination. Among the above-mentioned inorganic binders, silica sol is more desirably used.

Examples of the organic binder include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

Examples of the inorganic fibers include ceramic fiber such as alumina, silica, silica-alumina, glass, potassium titanate, aluminum borate, and the like. Examples thereof may further include whiskers made of alumina, silica, zirconia, titania, ceria, mullite, silicon carbide and the like. Each of these may be used alone, or two or more kinds of these may be used in combination. Among the inorganic fibers, alumina fibers are more desirably used.

Examples of the inorganic particles include carbides, nitrides and the like, more specifically, inorganic powder, made from silicon carbide, silicon nitride, boron nitride and the like. Each of these may be used alone, or two or more kinds of these may be used in combination. Among the above-mentioned inorganic particles, silicon carbide, which is superior in thermal conductivity, is more desirably used.

Moreover, balloons that are fine hollow spheres comprising oxide-based ceramics and a pore-forming agent such as spherical acrylic particles or graphite may be added to the above-mentioned paste used for forming the sealing material layer, if necessary.

Examples of the above-mentioned balloons include, although not particularly limited, alumina balloons, glass micro-balloons, shirasu balloons, flyash balloons (FA balloons), mullite balloons and the like. Among these, alumina balloons are more desirably used.

Moreover, a catalyst may be supported on the honeycomb structured body according to the embodiments of the present invention.

In the honeycomb structured body according to the embodiments of the present invention, by supporting a catalyst that enables converting of toxic gas components such as CO, HC, NOx in exhaust gases, it becomes possible to sufficiently convert toxic gas components in exhaust gases through a catalytic reaction. Further, by supporting a catalyst that helps the burning of PM, it becomes possible to burn and remove the PM easily. Consequently, the honeycomb structured body according to the embodiments of the present invention makes it possible to improve the performance of converting gas components in exhaust gases, and further to reduce the energy for burning the PM.

Examples of the catalyst include a catalyst made of noble metals such as platinum, palladium, rhodium, although not particularly limited thereto. The catalyst may be supported by including an element such as an alkali metal (Group 1 in Element Periodic Table), an alkali earth metal (Group 2 in Element Periodic Table), a rare-earth element (Group 3 in Element Periodic Table) and a transition metal element, in addition to the above-mentioned noble metals.

Moreover, when the above-mentioned catalyst is adhered to the honeycomb structured body according to the above-mentioned embodiments, the catalyst may be adhered thereto after the surface has been preliminarily coated with a catalyst supporting layer made of alumina or the like. With this arrangement, the specific surface area is made greater so that the degree of dispersion of the catalyst is improved and it becomes possible to increase the reaction sites of the catalyst. Furthermore, it becomes possible to prevent sintering of the catalyst metal by the catalyst supporting layer.

Examples of the material for the catalyst supporting layer include oxide ceramics, such as alumina, titania, zirconia and silica.

Here, the honeycomb structured body according to the embodiments of the present invention with catalyst supported thereon is allowed to function as a gas purifying device in the same manner as conventionally known DPFs (Diesel Particulate Filters) with a catalyst. Therefore, with respect to the case where the honeycomb structured body according to the embodiments of the present invention is used also as a catalyst supporting carrier, detailed description of the functions thereof is omitted.

A honeycomb structured body is required to have a low pressure loss as its basic characteristics. Effective means to reduce pressure loss include increasing porosity, increasing aperture ratio, and the like. However, a higher porosity, for example, presumably may easily cause deterioration of strength, and in a case where the porosity is raised, while a reinforcing member is provided at cell walls of all the cells, with the thickness of the cell walls being unchanged, for the purpose of securing the strength of the honeycomb structured body, there is a problem that the aperture ratio tends to be deteriorated, causing an increase in the pressure loss.

Moreover, when the reinforcing members are provided while securing the aperture ratio so as to avoid an increase in the pressure loss, the thickness of the cell walls needs to be reduced, and in such a case, it tends to become difficult to secure the strength of the honeycomb structured body.

In contrast, in the honeycomb structured body according to the present invention, it becomes possible to simultaneously ensure the suppression of the pressure loss at a low level and the securing of the strength, which are the characteristics contradictory to each another.

Namely, the honeycomb structured body according to the present invention makes it possible to secure the aperture ratio, suppress the pressure loss and at the same time to secure the strength by forming the shape of a space formed by a portion of the cells in a porous ceramic member constituting a honeycomb structured body into a specific shape.

Further, when an external force is applied to a conventional honeycomb structured body, presumably stress is focused on corner portions of cells, and cracks occur from this focal point of stress; however, according to the honeycomb structured body in accordance with the embodiments of the present invention, a porous ceramic member constituting the honeycomb structured body is provided with a filling body which fills in at least one corner portion of at least one outermost cell, and the cross-sectional shape of the outermost cell at the face orthogonal to the longitudinal direction of the cells is an almost tetragon, while the cross-sectional shape of the filling body at the face orthogonal to the longitudinal direction of the cells is an almost right triangle; therefore, it is presumed that it becomes difficult for stress to be focused on the corner portion and thus cracks hardly occur. Moreover, the filling body at the corner portion also functions as a reinforcing body to reinforce the cell walls, with the result that it becomes possible to avoid deformation of the cell walls, thereby reducing the occurrence of cracks even when an external stress is applied to the porous ceramic members.

Moreover, when the aperture ratio of the pores is set to a high rate, that is, to the aperture ratio of about 60% or more, it becomes possible for cracks to be prevented from being generated; thus, it becomes possible to keep the pressure loss at a low level, secure the strength of the honeycomb structured body and, by suppressing the unevenness in the discharged amount of material paste during extrusion-molding, further prevent damages such as cracks and the like from occurring. In addition, it becomes possible to avoid the occurrence of damage such as chips caused due to grasp by machine in the manufacturing process or contact between the ceramic members.

Next, the following description will discuss a method for manufacturing the honeycomb structured body according to the above-mentioned embodiments.

First, an extrusion-molding process is carried out by using a material paste mainly comprising the above-mentioned ceramic material so that a rectangular-pillar shaped ceramic molded body is manufactured.

With respect to the material paste, although not particularly limited, such paste as to set the porosity of porous ceramic members after production to at least about 40% and at most about 70% is desirably used, and for example, a material paste prepared by adding a binder, a dispersant solution and the like to powder (ceramic powder) containing the above-mentioned ceramics may be used.

With respect to the particle diameter of the ceramic powder, although not particularly limited, those which are less susceptible to shrinkage in the succeeding firing process are desirably used, and for example, those powders, prepared by combining 100 parts by weight of powders having an average particle diameter of at least about 3 μm and at most about 70 μm with at least about 5 parts by weight and at most about 65 parts by weight of powders having an average particle diameter of at least about 0.1 μm and at most about 1.0 μm, are preferably used.

Here, an oxidizing process may be carried out on the ceramic powder.

Examples of the above-mentioned binder include, although not particularly limited, methyl cellulose, carboxymethyl cellulose, hydroxyethyl cellulose, polyethylene glycol and the like.

In general, the compounding amount of the above-mentioned binder is desirably set to at least about 1 part by weight and at most about 15 parts by weight with respect to 100 parts by weight of the ceramic powder.

Examples of the dispersant solution include, although not particularly limited, an organic solvent such as benzene, alcohol such as methanol, water, and the like.

An appropriate amount of the above-mentioned dispersant solution is mixed therein so that the viscosity of the material paste is set within a fixed range.

The ceramic powder, the binder and dispersant solution are mixed by an attritor or the like, and sufficiently kneaded by a kneader or the like, and then the resulting material paste is extrusion-molded.

Moreover, a molding auxiliary may be added to the material paste, if necessary.

Examples of the molding auxiliary include, although not particularly limited, ethylene glycol, dextrin, fatty acid, fatty acid soap, polyvinyl alcohol and the like.

Furthermore, balloons that are fine hollow spheres comprising oxide-based ceramics and a pore-forming agent such as spherical acrylic particles and graphite may be added to the above-mentioned material paste.

Examples of the above-mentioned balloons include, although not particularly limited, alumina balloons, glass micro-balloons, shirasu balloons, flyash balloons (FA balloons), mullite balloons and the like. Among these, alumina balloons are more desirably used.

In this process, for carrying out extrusion molding, a die is select so as to form a shape in which corner portions of the tetragonal cells are provided with the filling body of which the cross-sectional shape is a right triangle.

Thus, when a molded body of a porous ceramic member having the above-mentioned shapes is manufactured through extrusion-molding, it becomes possible to solve the problems mentioned below.

Here, the filing body may be provided in the extrusion molding process as mentioned above, and also may be provided separately in a process after extrusion molding, for example, in a process of providing a plug described below; however, it is desirable to provide the filling body in the extrusion molding process, because an excellent productivity can be obtained.

That is, as with the porous ceramic member (honeycomb structured body) disclosed in the conventional art, when the shape of all the cells are formed so as to be provided with a filling body having the cross-sectional shape of a right triangle at the respective corner portions of the tetragonal cells, there is easily caused an unevenness in the discharged amount of the extruded material paste depending on the discharged portion, to thereby cause a case in which the extruded molded body is warped. Further, a case in which each of the side faces of the ceramic molded body forms a concaved shape towards the inside of the molded body, or a case in which the cross-sectional shape of the ceramic molded body is formed into a shape in which each of the sides located at the outer edge surface of the cross-section has a shape concaved towards the inside of the molded body tend to occur more easily. Therefore, reduction in the yield rate and damages such as cracks in the final product tend to easily occur.

Here, such problems occur because the discharged amount at the portion where the filling body is formed is too large; however, it can be considered that even making an attempt to reduce the discharged amount at the portion where the filling body is formed tends to make it difficult to resolve the problems since it is difficult to reduce the size of a backside hole of the die to an unlimited extent because of its design.

Further, for example, since it is difficult to constantly maintain a uniform viscosity of the material paste, it is difficult to maintain a uniform discharged amount, especially when the aperture ratio is set to a high rate. This may also be considered as one reason why it is difficult to resolve the above-mentioned problem.

In contrast, in the porous ceramic member constituting the honeycomb structured body according to the embodiments of the present invention, the filling body is formed to the outermost cell. Here, it is difficult for the above-mentioned problems to occur, and a molded body having a predetermined shape can be manufactured more easily.

Next, the above-mentioned ceramic molded body is dried by using a drier such as a microwave drier, a hot-air drier, a dielectric drier, a reduced-pressure drier, a vacuum drier and a freeze drier so that a ceramic dried body is formed. Thereafter, a predetermined amount of plug material paste, which forms plugs, is injected into the end portion on the outlet side of the inlet-side group of cells and the end portion on the inlet side of the outlet-side group of cells so that the cells are sealed.

With respect to the plug material paste, although not particularly limited, such paste as to set the porosity of a plug produced through the succeeding processes to at least about 30% and at most about 75% is desirably used, and for example, the same paste as the above-mentioned material paste may be used.

In this process, it becomes possible to adjust the length of the plug formed through the succeeding processesed by adjusting the amount of paste to be injected.

Next, degreasing (for example, at the temperature of at least about 200° C. and at most about 500° C.) and firing (for example, at the temperature of at least about 1400° C. and at most about 2300° C.) under predetermined conditions are carried out on the ceramic dried body in which the plug material paste is injected so that a porous ceramic member 20 constituted by a single sintered body as a whole, comprising a plurality of cells that are longitudinally placed in parallel with one another through cell walls, in which each of the cells has either one end portion sealed, is manufactured.

Here, with respect to the degreasing and firing conditions of the ceramic dried body, it is possible to apply conditions that have been conventionally used for manufacturing a filter made from porous ceramics.

Next, an adhesive paste to form the adhesive layer 11 is applied to each of the side faces of the porous ceramic member 20 with an even thickness to form an adhesive paste layer, and by repeating a process for successively piling up another porous ceramic member 20 on this adhesive paste layer, a porous ceramic member aggregated body having a predetermined size is manufactured. In order to secure the space between the porous ceramic members 20, there is a method in which a cavity holding member is attached to the surface of the porous ceramic member 20 and a plurality of the porous ceramic members 20 are combined with one another by interposing the cavity holding member so as to manufacture an aggregate body, and then an adhesive material paste is injected into the cavity between the porous ceramic members 20.

With respect to the material for forming the adhesive paste, since it has already been explained, the explanation thereof is omitted.

Next, the porous ceramic member aggregated body is heated so that the adhesive paste layer is dried and solidified to form the adhesive layer 11.

Moreover, by using a diamond cutter and the like, a cutting process is carried out on the porous ceramic member aggregated body in which a plurality of the porous ceramic members 20 are bonded to one another by interposing the adhesive layer 11 so that a ceramic block 15 having a cylindrical shape is manufactured. Moreover, porous ceramic members varying in shape may be combined with one another and bonded through bonding materials so that a ceramic block having a cylindrical shape as a whole is manufactured.

By forming a sealing material layer 12 on the outer periphery of the ceramic block 15 by using the sealing material paste, a honeycomb structured body 10 in which the sealing material layer 12 is formed on the outer periphery of the cylindrical ceramic block 15 having a plurality of the porous ceramic members 20 bonded to one another by interposing the adhesive layers 11.

Thereafter, a catalyst is supported on the honeycomb structured body, if necessary. The supporting process of a catalyst may be carried out on the porous ceramic member prior to the manufacturing of the aggregated body.

In the case where a catalyst is supported, desirably, an alumina film having a large specific surface area is formed on the surface of the honeycomb structured body, and a co-catalyst as well as a catalyst such as platinum is adhered to the surface of this alumina film.

With respect to the method for forming the alumina film on the surface of the honeycomb structured body, for example, a method in which the honeycomb structured body is impregnated with a solution of a metal compound containing aluminum such as $Al(NO_3)_3$ and then heated and a method in which the honeycomb structured body is impregnated with a solution containing alumina powder and then heated can be mentioned.

With respect to the method for adhering the co-catalyst, for example, a method in which the honeycomb structured body is impregnated with a solution of a metal compound containing rare earth element such as $Ce(NO_3)_3$ and then heated is proposed.

With respect to the method for supporting the catalyst, for example, a method in which the honeycomb structured body is impregnated with, for example, a nitric acid solution of diammine dinitro platinum ($[Pt(NH_3)_2(NO_2)_2]$ $HNO_3$, platinum concentration: about 4.53% by weight) and then heated is proposed.

Moreover, the catalyst may also be supported through a method in which the catalyst is adhered to an alumina particle in advance, to impregnate the honeycomb structured body with a solution containing alumina powder with a catalyst adhered thereto, and heat it thereafter.

Figure 4:
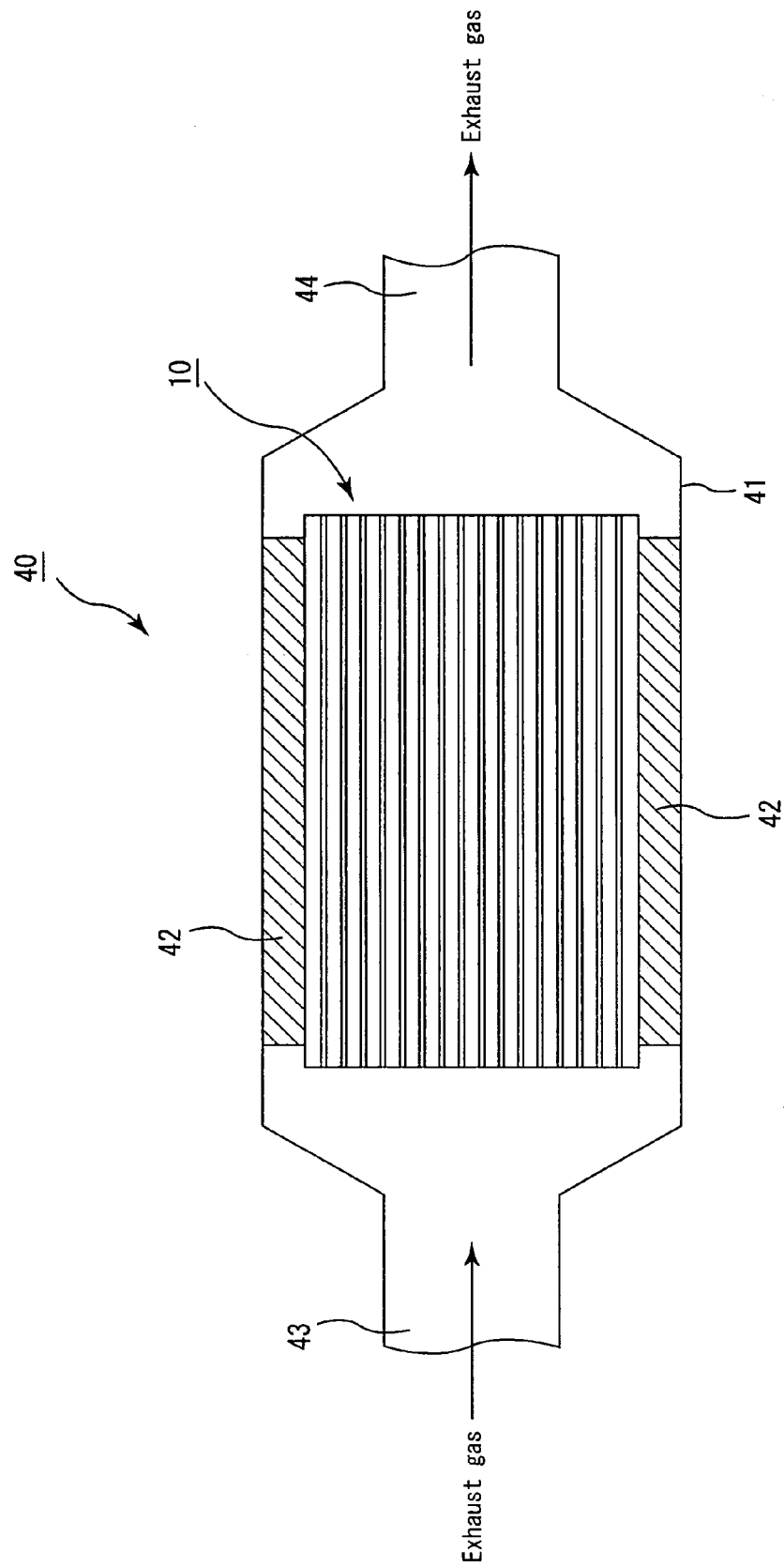
FIG. 4 is a cross-sectional view that schematically shows one example of an exhaust gas purifying device in which the honeycomb structured body according to an embodiment of the present invention is installed.

FIG. 4 is a cross-sectional view that schematically shows one example of an exhaust gas purifying device for a vehicle in which the honeycomb structured body according to the embodiments of the present invention is installed.

As shown in FIG. 4, an exhaust gas purifying device 40 is mainly constituted by a honeycomb structured body 10, a casing 41 that covers the periphery of the honeycomb structured body 10, and a holding sealing material 42 that is placed between the honeycomb structured body 10 and the casing 41; and connected to one end of the casing 41 on the exhaust gas inlet side is an introducing pipe 43, which is connected to an internal combustion system such as an engine, and connected to the other end of the casing 41 is an exhaust pipe 44 connected to the outside. Moreover, the arrows in FIG. 4 show flows of exhaust gases.

Furthermore, in FIG. 4, the shape of the honeycomb structured body 10 is not particularly limited, and may be cylindrical shape or cylindroid shape. In these cases, however, the casings need to be formed into shapes which fit the shapes of the respective honeycomb structured bodies.

In the exhaust gas purifying device 40 having the above-mentioned configuration, exhaust gases discharged from the internal combustion system such as an engine, are directed into the casing 41 through the introducing pipe 43, and allowed to flow into the honeycomb structured body 10 from inlet-side cells; after having passed through the partition walls where the PM are captured and being purified thereby, the exhaust gases are discharged out of the honeycomb structured body from outlet-side cells, and then discharged to the outside through the exhaust pipe 44.

Moreover, in an exhaust gas filter on which a catalyst for purifying exhaust gases is supported, a toxic component, for example CO, HC, NOx and the like included in exhaust gases are converted to $CO_2$, $H_2O$, $N_2$ and the like, respectively, and discharged outside the bodies.

In the exhaust-gas purifying device 40, after a large quantity of PM have been accumulated on the partition walls of the honeycomb structured body 10 to cause an increase in pressure loss, a regenerating process is carried out on the honeycomb structured body 10.

In the regenerating process, gases, heated by using a heating means that is not shown herein, are allowed to flow into the honeycomb structured body so that the honeycomb structured body 10 is heated to burn and eliminate the PM accumulated on the partition walls. Moreover, the particulates may be burned and eliminated by using a post-injection system.

EXAMPLES

The following description will discuss the present invention in detail by means of examples; however, the present invention is not intended to be limited by these examples.

Example 1

An α-type silicon carbide powder having an average particle diameter of 22 μm (hereinafter referred to as SiC coarse powder) (6000 parts by weight), 2570 parts by weight of an α-type silicon carbide powder having an average particle diameter of 0.5 μm (hereinafter referred to as SiC fine powder), 700 parts by weight of an organic binder (methyl cellulose), 300 parts by weight of a pore forming agent (acrylic resin) having an average particle diameter of 20 μm with pores formed therein, 330 parts by weight of a lubricant (UNILUB, manufactured by NOF Corp.), 150 parts by weight of glycerin, and an appropriate amount of water were blended and evenly mixed to prepare a mixed material composition. This mixed composition was charged into an extrusion molding apparatus, and extrusion molded to manufacture a raw molded body in which corner portions of cells are provided with a filling body as shown in FIG. 2, and the corner portion of the molded body had the shape of a R-chamfered corner.

Next, the above-mentioned raw molded bodies were dried by using a microwave dryer or the like to prepare ceramic dried bodies, and predetermined cells were then filled with a plug material paste having the same composition as the composition used for extrusion-molding.

Next, after these had been again dried by using a dryer, the resulting products were degreased at 400° C., and fired at 2200° C. in a normal-pressure argon atmosphere for 3 hours to manufacture porous ceramic members 20, each of which comprises a silicon carbide sintered body having a size of 34.3 mm×34.3 mm×150 mm, the number of cells 21 (cell density) of 46.5 pcs/cm², a thickness of the cell wall of 0.241 mm, a thickness of the outer edge wall of 0.400 mm, and an aperture ratio of 66.4%. Here, the length $L_2$ of one side of a filling body having a right triangle shape (isosceles right triangle shape) provided at corner portions of a square-shaped cell at a cross section perpendicular to the longitudinal direction of the cells, was set to 10% of the length $L_1$ of one side of the cell before the filling body was provided, and the length of the R-chamfered portion having a shape of a quarter circle and formed at the corner portion of the porous ceramic member 20 was set to 1 mm.

As in the present Example, the shape of the die may be appropriately selected so that the material is extrusion molded such that it has a shape of a chamfered corner in the first place. Alternatively, the material may be extrusion molded such that it has a corner and after the extrusion-molding, a process (cutting process using piano wires, diamond cutters and the like, and a polishing process using a grinder and the like) may be carried out to form a shape of a chamfered corner. The timing at which the shape of a chamfered corner is formed is not particularly limited, and may be carried out between any of the processes of extrusion-molding, the degreasing process, drying process, and firing process, or after the firing process as long as it is appropriately selected upon consideration of working efficiency; however, extrusion-molding carried out by using a die that forms a shape of a chamfered corner in the first place is more efficient because there is no need to carry out a separate process after producing the die for extrusion-molding.

Next, by using a heat resistant adhesive paste containing 30% by weight of alumina fibers having an average fiber length of 20 μm, 21% by weight of silicon carbide particles having an average particle diameter of 0.6 μm, 15% by weight of silica sol, 5.6% by weight of carboxy methyl cellulose and 28.4% by weight of water, a number of the porous ceramic members 20 were bonded to one another, and this was further dried at 120° C., and was cut by using a diamond cutter so that a cylindrical ceramic block 15 with an adhesive material layer having a thickness of 1 mm was manufactured.

Next, ceramic fibers made from alumina silicate (shot content: 3%, average fiber length: 100 μm) (23.3% by weight), which served as inorganic fibers, silicon carbide powder having an average particle diameter of 0.3 μm (30.2% by weight), which served as inorganic particles, silica sol ($SiO_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer having a thickness of 0.2 mm was formed on the outer peripheral portion of the ceramic block 15 by using the above-mentioned sealing material paste. Further, this sealing material paste layer was dried at 120° C. so that a cylindrical aggregated honeycomb structured body 10 having a size of 143.8 mm in diameter×150 mm in length was manufactured.

Tables 1 and 2 show in detail the structures, shapes and dimensions of a porous ceramic member constituting the manufactured honeycomb structured body. In Table 2, (b) and (c) shown in the item of Table 1 mean that porous ceramic members each having the respective structures (b) and (c), which were described in detail in Table 1, were manufactured, and the resulting porous ceramic members were used.

Examples 2 to 9

The same processes as those of Example 1 were carried out to manufacture a honeycomb structured body, except that the structure of the porous ceramic members, aperture ratio, thickness of cell walls, thickness of outer edge walls, cell density or ratio of the length of one side of a filling body to the length of one side of a cell before forming the filling body (hereinafter, referred to as ratio of one side of a filling body) was changed as shown in Tables 1 and 2. Here, when the outer corner was formed into a shape of a chamfered corner, the shape of the chamfered corner was a shape of a R-chamfered corner as in Example 1.

Comparative Examples 1 to 7

The same processes as those of Example 1 were carried out to manufacture a honeycomb structured body, except that the structure of the porous ceramic members, aperture ratio, thickness of cell walls, thickness of outer edge walls, cell density or ratio of one side of a filling body to the length of one side of a cell was changed as shown in Tables 1 and 3. Here, when the outer corner was formed into a shape of a chamfered corner, the shape of the chamfered corner was a shape of a R-chamfered corner as in Example 1.

In Table 3, (a) to (e) shown in the item of Table 1 mean that porous ceramic members each having the respective structures (a) to (e), which were described in detail in Table 1, were manufactured, and the resulting porous ceramic members were used.

Moreover, with respect to the cross-sectional shape of the filling body, the expression "the hypotenuse of a right triangle is curved" means that the cross-sectional shape of the filling body was a shape of a right triangle in which a hypotenuse line connecting the two apexes on the acute angles is smoothly curved, and the hypotenuse is curved toward the direction of the apex on the right angle of the right triangle, i.e., toward the outside of the cell.

The evaluations (measurement) mentioned below were carried out on the honeycomb structured bodies obtained in Examples 1 to 9 and Comparative Examples 1 to 7.

(1) Measurement of Pressure Loss

Each of the porous ceramic members relating to the Examples and the Comparative Examples was connected to a blower, and gas (air flow) was passed there through at a flow rate of 13 m/s; thus the pressure loss in the honeycomb structured body was measured. The results are as shown in Tables 2 and 3.

(2) Occurrence of Cracks upon Regeneration

After the honeycomb structured bodies according to the respective Examples and Comparative Examples were made to capture 8 g/L of PM, a regenerating process was carried out on the porous ceramic members, and the regenerated porous ceramic members were observed for the presence or absence of cracks. The results were as shown below in Tables 2 and 3.

TABLE 1

| | Structure of porous ceramic member constituting honeycomb structured body |
|---|---|
| (a) | Structure in which outer edge walls are made thicker |
| (b) | Structure in which a filling body is provided at a corner portion constituted by an outer edge wall of outermost cells and a corner portion constituted by an outer edge wall and a cell wall |
| (c) | Structure equipped with both the Structure (a) and the Structure (b) |
| (d) | Structure equipped with neither the Structure (a) nor the Structure (b) |
| (e) | Structure in which a filling body is provided at all corner portions of all cells |

TABLE 2

| | Structure of porous ceramic member | | | Cell wall | Outer edge | | Ratio of one side | | Occurrence of cracks |
| | Table 1 | Cross-sectional shape of filling body | Chamfered corner of outer edge surface *2 | Aperture ratio (%) | Thickness $L_4$ (mm) | wall Thickness $L_3$ (mm) | Cell density (cpsi) | of filling body (%) *1 | Pressure loss | upon capturing 8 g/L of PM |
|---|---|---|---|---|---|---|---|---|---|---|
| Example 1 | (c) | Right triangle | Present (R-chamfered corner *2) | 66.4 | 0.24 | 0.40 | 326 | 10 | 8.2 | Cracks not present |
| Example 2 | (c) | Right triangle | Not present | 66.4 | 0.24 | 0.40 | 326 | 10 | 8.2 | Cracks merely present at the corner |
| Example 3 | (c) | Right triangle | Present (R-chamfered corner) | 66.4 | 0.24 | 0.40 | 326 | 5 | 8.2 | Cracks not present |
| Example 4 | (c) | Right triangle | Present (R-chamfered corner) | 66.4 | 0.24 | 0.40 | 327 | 20 | 8.3 | Cracks not present |
| Example 5 | (c) | Right triangle | Present (R-chamfered corner) | 66.4 | 0.23 | 0.40 | 327 | 30 | 8.3 | Cracks not present |
| Example 6 | (c) | Right triangle | Present (R-chamfered corner) | 66.4 | 0.23 | 0.40 | 327 | 40 | 8.4 | Cracks not present |
| Example 7 | (c) | Right triangle | Present (R-chamfered corner) | 60.0 | 0.30 | 0.40 | 325 | 10 | 8.4 | Cracks not present |
| Example 8 | (c) | Right triangle | Present (R-chamfered corner) | 70.0 | 0.20 | 0.30 | 380 | 10 | 8.2 | Cracks not present |
| Example 9 | (b) | Right triangle | Present (R-chamfered corner) | 66.4 | 0.25 | 0.25 | 321 | 10 | 8.2 | Cracks not present |

Note)
*1 ratio (%) of one side of filling body refers to the value of $L_2/L_1$ as of the dimensions shown in FIG. 3

Note)
*2 a chamfered corner or a R-chamfered corner refers to the shape of a chamfered corner or the shape of a R-chamfered corner

TABLE 3

| | Structure of porous ceramic member | | | Cell wall | Outer edge | | Ratio of one side | | Occurrence of cracks |
| | Table 1 | Cross-sectional shape of filling body | Chamfered corner of outer edge surface *2 | Aperture ratio (%) | Thickness $L_4$ (mm) | wall Thickness $L_3$ (mm) | Cell density (cpsi) | of filling body (%) *1 | Pressure loss | upon capturing 8 g/L of PM |
|---|---|---|---|---|---|---|---|---|---|---|
| Comparative Example 1 | (d) | n/a | Present (R-chamfered corner *2) | 66.4 | 0.25 | 0.25 | 320 | n/a | 8.2 | Cracks generated |
| Comparative Example 2 | (c) | Right triangle with curved hypotenuse | Present (R-chamfered corner) | 66.4 | 0.24 | 0.40 | 326 | 10 | 8.2 | Cracks generated |
| Comparative Example 3 | (c) | Right triangle with curved hypotenuse | Not present | 66.4 | 0.24 | 0.40 | 326 | 10 | 8.2 | Cracks generated |

TABLE 3-continued

|  | | Structure of porous ceramic member | | Cell wall | Outer edge | | Ratio of one side | | Occurrence of cracks |
| --- | --- | --- | --- | --- | --- | --- | --- | --- | --- |
|  | Table 1 | Cross-sectional shape of filling body | Chamfered corner of outer edge surface *2 | Aperture ratio (%) | Thickness $L_4$ (mm) | wall Thickness $L_3$ (mm) | Cell density (cpsi) | of filling body (%) *1 | Pressure loss | upon capturing 8 g/L of PM |
| Comparative Example 4 | (c) | Right triangle | Present (R-chamfered corner) | 57.0 | 0.33 | 0.40 | 325 | 10 | 10.0 | Cracks not present |
| Comparative Example 5 | (a) | n/a | Present (R-chamfered corner) | 66.4 | 0.24 | 0.40 | 326 | n/a | 8.2 | Cracks generated |
| Comparative Example 6 | (b) | Right triangle with curved hypotenuse | Present (R-chamfered corner) | 66.4 | 0.25 | 0.25 | 321 | 10 | 8.2 | Cracks generated |
| Comparative Example 7 | (e) | Right triangle with curved hypotenuse | Present (R-chamfered corner) | 66.4 | 0.24 | 0.24 | 320 | 10 | 10.5 | Cracks generated |

Note)
*1 ratio (%) of one side of the filling body refers to the value of $L_2/L_1$ as of the dimensions shown in FIG. 3
Note)
*2 a chamfered corner or a R-chamfered corner refers to the shape of a chamfered corner or the shape of a R-chamfered corner As shown in Table 2, in the honeycomb structured bodies according to the Examples (in the porous ceramic members constituting the honeycomb structured bodies), the pressure loss did not become low, and cracks did not occur at the time of capturing 8 g/L of PM, whereas in the honeycomb structured bodies according to the Comparative Examples (in the porous ceramic members constituting the honeycomb structured bodies), the pressure loss became high or cracks were likely to be generated. However, in Example 2, mere cracks were generated at the corner of the porous ceramic member. The reason for this is presumably because the shape of the outer corner thereof does not have the shape of a chamfered corner.

Moreover, almost the same results were obtained though the same tests were carried out by forming the outer corner into the shape of a C-chamfered corner instead of the shape of a R-chamfered corner.

The description in the above mainly discusses the honeycomb structured body according to the embodiments of the present invention, by taking a honeycomb structured body which can be suitably used as a ceramic filter as an example. However, in the honeycomb structured body according to the embodiments of the present invention, the honeycomb structured body may be manufactured without being filled with a plug material paste as mentioned above, and the honeycomb structured body according to such an embodiment in which the end portion of the cells is not sealed with the plug may be suitably used as a catalyst supporting carrier, and such a honeycomb structured body may exert the same effects as those of the present invention in which the honeycomb structured body is used as a ceramic filter.

What is claimed as new and desired to be secured by Letters Patent of the United States is:

1. A honeycomb structured body, comprising:
a plurality of porous ceramic members bonded together;
an adhesive layer interposed between adjacent porous ceramic members,
each of the porous ceramic members having a plurality of cells placed in parallel with one another in a longitudinal direction, cell walls interposed between adjacent cells, an outer edge wall on an outer edge surface thereof, corner portions of the cells defined either solely by said outer edge wall or by said outer edge wall and said cell wall, and a filling body being disposed in at least one corner portion of at least one outermost cell in each of the porous ceramic members,
wherein a first profile of the outermost cell at a cross-section perpendicular to the longitudinal direction of said cells is approximately a tetragon, and
a second profile of the outermost cell at the same cross-section perpendicular to the longitudinal direction of said cells is approximately a right triangle, and
wherein a first length of one side of said right triangle is at least about 5% and at most about 40% of a second length of one side of said tetragon.

2. The honeycomb structured body according to claim 1, wherein a thickness of said outer edge wall of said porous ceramic members is greater than a thickness of said cell wall.

3. The honeycomb structured body according to claim 2, wherein the thickness of said outer edge wall is at least about 1.3 times and at most about 3.0 times greater than the thickness of said cell wall.

4. The honeycomb structured body according to claim 1, wherein either one of opposite end portions of each of said cells in the longitudinal direction is sealed.

5. The honeycomb structured body according to claim 1, wherein at least one outer corner at an outer periphery of said porous ceramic members has a shape of a chamfered corner.

6. The honeycomb structured body according to claim 5, wherein a length of a chamfered portion of said shape of the chamfered corner is at least about 0.3 mm and at most about 2.5 mm in a cross-section perpendicular to said cells.

7. The honeycomb structured body according to claim 5, wherein a ratio of a length of a chamfered portion of said shape of the chamfered corner with respect to a length of one side of said porous ceramic members is at least about 0.8% and at most about 7.5%, in a cross-section perpendicular to said cells.

8. The honeycomb structured body according to claim 1, wherein each outer corner in the longitudinal direction of said porous ceramic members has a shape of a chamfered corner.

9. The honeycomb structured body according to claim 1, wherein said porous ceramic members have an aperture ratio of the cells of about 60% or more at a cross-section perpendicular to the longitudinal direction.

10. The honeycomb structured body according to claim 1, wherein a thickness of said cell wall is at least about 0.1 mm and at most about 0.4mm.

11. The honeycomb structured body according to claim 10, wherein the thickness of said cell wall is in the range of about 0.2 mm to about 0.3 mm.

12. The honeycomb structured body according to claim 1, on which a catalyst is supported.

13. The honeycomb structured body according to claim 1, wherein
said plurality of porous ceramic members comprise at least two kinds of porous ceramic members having different shapes.

14. The honeycomb structured body according to claim 13, wherein a thickness of said outer edge wall of said porous ceramic members is greater than a thickness of said cell wall.

15. The honeycomb structured body according to claim 14, wherein the thickness of said outer edge wall is at least about 1.3 times and at most about 3.0 times greater than the thickness of said cell wall.

16. The honeycomb structured body according to claim 13, wherein either one of opposite end portions of each of said cells in the longitudinal direction is sealed.

17. The honeycomb structured body according to claim 13, wherein at least one outer corner at an outer periphery of said porous ceramic members has a shape of a chamfered corner.

18. The honeycomb structured body according to claim 17, wherein a length of a chamfered portion of said shape of the chamfered corner is at least about 0.3 mm and at most about 2.5 mm in a cross-section perpendicular to said cells.

19. The honeycomb structured body according to claim 17, wherein a ratio of a length of a chamfered portion of said shape of the chamfered corner with respect to a length of one side of said porous ceramic members is at least about 0.8% and at most about 7.5%, in a cross-section perpendicular to said cells.

20. The honeycomb structured body according to claim 13, wherein each outer corner in the longitudinal direction of said porous ceramic members has a shape of a chamfered corner.

21. The honeycomb structured body according to claim 13, wherein said porous ceramic members have an aperture ratio of the cells of about 60% or more at a cross-section perpendicular to the longitudinal direction.

22. The honeycomb structured body according to claim 13, wherein a thickness of said cell wall is at least about 0.1 mm and at most about 0.4 mm.

23. The honeycomb structured body according to claim 22, wherein the thickness of said cell wall is in the range of about 0.2 mm to about 0.3 mm.

24. The honeycomb structured body according to claim 13, on which a catalyst is supported.

25. A method for manufacturing a honeycomb structured body, comprising:
manufacturing a ceramic molded body through extrusion-molding, using a raw material paste containing a ceramic material as a main component, said ceramic molded body having a plurality of cells placed in parallel with one another in the longitudinal direction with a cell wall therebetween;
manufacturing a plurality of porous ceramic members through manufacturing of said porous ceramic members by degreasing and firing said ceramic molded body, each of said porous ceramic members having a plurality of cells placed in parallel with one another in the longitudinal direction with a cell wall therebetween, an outer edge wall on an outer edge surface thereof, and corner portions of the cells defined either solely by said outer edge wall or by said outer edge wall and said cell wall;
manufacturing a porous ceramic member aggregated body by aggregating said plurality of porous ceramic members by interposing an adhesive paste layer; and
drying said adhesive paste layer to solidify said adhesive paste layer,
wherein upon manufacturing said ceramic molded body, a filling body is provided in at least one corner portion of at least one outer most cell in each of the porous ceramic members using a die,
a first profile of the outermost cell at a cross-section perpendicular to the longitudinal direction of said cells is approximately a tetragon, and
a second profile of the outermost cell at the same cross-section perpendicular to the longitudinal direction of said cells is approximately a right triangle, and
wherein a first length of one side of said right triangle is at least about 5% and at most about 40% of a second length of one side of said tetragon.

26. The method for manufacturing a honeycomb structured body according to claim 25 wherein a thickness of said outer edge wall of said porous ceramic members is greater than a thickness of the cell wall of said porous ceramic members.

27. The method for manufacturing a honeycomb structured body according to claim 26, wherein the thickness of said outer edge wall is at least about 1.3 times and at most about 3.0 times greater than the thickness of the cell wall of said porous ceramic members.

28. The method for manufacturing a honeycomb structured body according to claim 25, further comprising sealing said cells by filling a plug material paste into either one of opposite end portions of each of the cells of said ceramic molded body, after manufacturing said ceramic molded body.

29. The method for manufacturing a honeycomb structured body according to claim 25, further comprising forming a shape of a chamfered corner on at least one outer corner at an outer periphery of said porous ceramic members.

30. The method for manufacturing a honeycomb structured body according to claim 29, wherein a length of a chamfered portion of said shape of the chamfered corner is at least about 0.3 mm and at most about 2.5 mm in a cross-section perpendicular to the cells of said porous ceramic members.

31. The method for manufacturing a honeycomb structured body according to claim 25, further comprising forming a shape of a chamfered corner on each outer corner in the longitudinal direction of said porous ceramic members.

32. The method for manufacturing a honeycomb structured body according to claim 25, wherein said porous ceramic members have an aperture ratio of the cells of about 60% or more at a cross-section perpendicular to the longitudinal direction.

33. The method for manufacturing a honeycomb structured body according to claim 25, wherein a thickness of the cell wall of said porous ceramic members is at least about 0.1 mm and at most about 0.4 mm.

34. The method for manufacturing a honeycomb structured body according to claim 24, wherein the thickness of the cell wall of said porous ceramic members is in the range of about 0.2 mm to about 0.3 mm.

35. The method for manufacturing a honeycomb structured body according to claim 25, further comprising supporting a catalyst on said porous ceramic members after firing said ceramic molded body or after drying said adhesive paste layer to solidify said adhesive paste layer in said manufacturing of said porous ceramic members.

36. The method for manufacturing a honeycomb structured body according to claim 25, further comprising manufacturing a ceramic block by drying said adhesive paste layer to solidify said adhesive paste layer, said ceramic block comprising a plurality of porous ceramic members that are combined with one another by interposing an adhesive layer; and forming a sealing material layer on the peripheral portion of said ceramic block.

37. The method for manufacturing a honeycomb structured body according to claim 25,
wherein
upon manufacturing said porous ceramic member aggregated body,
at least two kinds of porous ceramic members having different shapes are aggregated.

38. The method for manufacturing a honeycomb structured body according to claim 37, wherein a thickness of said outer edge wall of said porous ceramic members is greater than a thickness of the cell wall of said porous ceramic members.

39. The method for manufacturing a honeycomb structured body according to claim 38, wherein the thickness of said outer edge wall is at least about 1.3 times and at most about 3.0 times greater than the thickness of the cell wall of said porous ceramic members.

40. The method for manufacturing a honeycomb structured body according to claim 37, further comprising sealing said cells by filling a plug material paste into either one of opposite end portions of each of the cells of said ceramic molded body, after manufacturing said ceramic molded body.

41. The method for manufacturing a honeycomb structured body according to claim 37, further comprising forming a shape of a chamfered corner on at least one outer corner at an outer periphery of said porous ceramic members.

42. The method for manufacturing a honeycomb structured body according to claim 41, wherein a ratio of a length of the chamfered portion of said shape of the chamfered corner with respect to a length of one side of said porous ceramic members is at least about 0.8% and at most about 7.5%, in a cross-section perpendicular to the cells of said porous ceramic members.

43. The method for manufacturing a honeycomb structured body according to claim 41, wherein a length of a chamfered portion of said shape of the chamfered corner is at least about 0.3 mm and at most about 2.5 mm in a cross-section perpendicular to the cells of said porous ceramic members.

44. The method for manufacturing a honeycomb structured body according to claim 41, wherein a ratio of a length of the chamfered portion of said shape of the chamfered corner with respect to a length of one side of said porous ceramic members is at least about 0.8% and at most about 7.5%, in a cross-section perpendicular to the cells of said porous ceramic members.

45. The method for manufacturing a honeycomb structured body according to claim 41, wherein a length of a chamfered portion of said shape of the chamfered corner is at least about 0.3 mm and at most about 2.5 mm in a cross-section perpendicular to the cells of said porous ceramic members.

46. The method for manufacturing a honeycomb structured body according to claim 41, wherein a ratio of a length of the chamfered portion of said shape of the chamfered corner with respect to a length of one side of said porous ceramic members is at least about 0.8% and at most about 7.5%, in a cross-section perpendicular to the cells of said porous ceramic members.

47. The method for manufacturing a honeycomb structured body according to claim 37, further comprising forming a shape of a chamfered corner on each outer corner in the longitudinal direction of said porous ceramic members.

48. The method for manufacturing a honeycomb structured body according to claim 37, wherein said porous ceramic members have an aperture ratio of the cells of about 60% or more at a cross-section perpendicular to the longitudinal direction.

49. The method for manufacturing a honeycomb structured body according to claim 37, wherein a thickness of the cell wall of said porous ceramic members is at least about 0.1 mm and at most about 0.4 mm.

50. The method for manufacturing a honeycomb structured body according to claim 49, wherein the thickness of the cell wall of said porous ceramic members is in the range of about 0.2 mm to about 0.3 mm.

51. The method for manufacturing a honeycomb structured body according to claim 37, wherein further comprising supporting a catalyst on said porous ceramic members after firing said ceramic molded body or after drying said adhesive paste layer to solidify said adhesive paste layer in said manufacturing of said porous ceramic members.

52. The method for manufacturing a honeycomb structured body according to claim 37, wherein further comprising manufacturing a ceramic block by drying said adhesive paste layer to solidify said adhesive paste layer, said ceramic block comprising a plurality of porous ceramic members that are combined with one another by interposing an adhesive layer; and forming a sealing material layer on the peripheral portion of said ceramic block.

53. The method for manufacturing a honeycomb structured body according to claim 52, wherein the thickness of the cell wall of said porous ceramic members is in the range of about 0.2 mm to about 0.3 mm.

54. A method for manufacturing a honeycomb structured body, comprising:
manufacturing a ceramic molded body through extrusion-molding, using a raw material paste containing a ceramic material as a main component, said ceramic molded body having a plurality of cells placed in parallel with one another in the longitudinal direction with a cell wall therebetween;
manufacturing a plurality of porous ceramic members through manufacturing of said porous ceramic members by degreasing and firing said ceramic molded body, each of said porous ceramic members having a plurality of cells placed in parallel with one another in the longitudinal direction with a cell wall therebetween, an outer edge wall on an outer edge surface thereof, and corner portions of the cells defined either solely by said outer edge wall or by said outer edge wall and said cell wall;
manufacturing a porous ceramic member aggregated body by aggregating said plurality of porous ceramic members by interposing an adhesive paste layer; and
drying said adhesive paste layer to solidify said adhesive paste layer,
wherein
in said manufacturing of said porous ceramic members, a filling body is formed in at least one corner portion of at least one outer most cell in each of the porous ceramic members after manufacturing of said ceramic molded body,
a first profile of the outermost cell at a cross-section perpendicular to the longitudinal direction of said cells is approximately a tetragon, and
a second profile of the outermost cell at the same cross-section perpendicular to the longitudinal direction of said cells is approximately a right triangle, and
wherein a first length of one side of said right triangle is at least about 5% and at most about 40% of a second length of one side of said tetragon.

55. The method for manufacturing a honeycomb structured body according to claim 54, wherein a thickness of said outer edge wall of said porous ceramic members is greater than a thickness of the cell wall of said porous ceramic members.

56. The method for manufacturing a honeycomb structured body according to claim 54, further comprising sealing said cells by filling a plug material paste into either one of opposite end portions of each of the cells of said ceramic molded body, after manufacturing said ceramic molded body.

57. The method for manufacturing a honeycomb structured body according to claim 54, further comprising forming a shape of a chamfered corner on at least one outer corner at an outer periphery of said porous ceramic members.

58. The method for manufacturing a honeycomb structured body according to claim 54, further comprising forming a shape of a chamfered corner on each outer corner in the longitudinal direction of said porous ceramic members.

59. The method for manufacturing a honeycomb structured body according to claim 54, wherein said porous ceramic members have an aperture ratio of the cells of about 60% or more at a cross-section perpendicular to the longitudinal direction.

60. The method for manufacturing a honeycomb structured body according to claim 54, wherein the thickness of said outer edge wall is at least about 1.3 times and at most about 3.0 times greater than the thickness of the cell wall of said porous ceramic members.

61. The method for manufacturing a honeycomb structured body according to claim 54, wherein a thickness of the cell wall of said porous ceramic members is at least about 0.1 mm and at most about 0.4 mm.

62. The method for manufacturing a honeycomb structured body according to claim 54, further comprising supporting a catalyst on said porous ceramic members after firing said ceramic molded body or after drying said adhesive paste layer to solidify said adhesive paste layer in said manufacturing of said porous ceramic members.

63. The method for manufacturing a honeycomb structured body according to claim 54, further comprising manufacturing a ceramic block by drying said adhesive paste layer to solidify said adhesive paste layer, said ceramic block comprising a plurality of porous ceramic members that are combined with one another by interposing an adhesive layer; and forming a sealing material layer on the peripheral portion of said ceramic block.

64. An exhaust gas purifying device, comprising:
a honeycomb structured body in which a plurality of porous ceramic members bonded together; an adhesive layer interposed between adjacent porous ceramic members, each of the porous ceramic members having a plurality of cells placed in parallel with one another in a longitudinal direction, cell walls interposed between adjacent cells, an outer edge wall on an outer edge surface thereof, corner portions of the cells defined either solely by said outer edge wall or by said outer edge wall and said cell wall, and a filling body disposed in at least one corner portion of at least one outermost cell in each of the porous ceramic members;
a casing that covers the periphery of said honeycomb structured body; and
a holding sealing material that is placed between said honeycomb structured body and said casing, one end of said casing at an exhaust gas inlet side being connected to an introducing pipe that is connected to an internal combustion system, the other end of said casing being connected to an exhaust pipe that is connected to the outside, wherein
a first profile of the outermost cell at a cross-section perpendicular to the longitudinal direction of said cells is approximately a tetragon, and
a second profile of the outermost cell at the same cross-section perpendicular to the longitudinal direction of said cells is approximately a right triangle, and
wherein a first length of one side of said right triangle is at least about 5% and at most about 40% of a second length of one side of said tetragon.

65. The exhaust gas purifying device according to claim 64, wherein a thickness of said outer edge wall of said porous ceramic members is greater than a thickness of said cell wall.

66. The exhaust gas purifying device according to claim 65, wherein the thickness of said outer edge wall is at least about 1.3 times and at most about 3.0 times greater than the thickness of said cell wall.

67. The exhaust gas purifying device according to claim 64, wherein either one of opposite end portions of each of said cells in the longitudinal direction is sealed.

68. The honeycomb structured body according to claim 64, wherein at least one outer corner at an outer periphery of said porous ceramic members has a shape of a chamfered corner.

69. The honeycomb structured body according to claim 68, wherein a length of a chamfered portion of said shape of the chamfered corner is at least about 0.3 mm and at most about 2.5 mm in a cross-section perpendicular to said cells.

70. The honeycomb structured body according to claim 68, wherein a ratio of a length of a chamfered portion of said shape of the chamfered corner with respect to a length of one side of said porous ceramic members is at least about 0.8% and at most about 7.5%, in a cross-section perpendicular to said cells.

71. The honeycomb structured body according to cllaim 64, wherein each outer corner in the longitudinal direction of said porous ceramic members has a shape of a chamfered corner.

72. The exhaust gas purifying device according to claim 64, wherein said porous ceramic members have an aperture ratio of the cells of about 60% or more at a cross-section perpendicular to the longitudinal direction.

73. The honeycomb structured body according to claim 64, wherein a thickness of said cell wall is at least about 0.1 mm and at most about 0.4 mm.

74. The exhaust gas purifying device according to claim 73, wherein the thickness of said cell wall is in the range of about 0.2 mm to about 0.3 mm.

75. The exhaust gas purifying device according to claim 64, wherein a catalyst is supported on said honeycomb structured body.

76. The exhaust gas purifying device according to claim 64, wherein
said plurality of porous ceramic members comprise at least two kinds of porous ceramic members having different shapes.

77. The exhaust gas purifying device according to claim 76, wherein a thickness of said outer edge wall of said porous ceramic members is greater than a thickness of said cell wall.

78. The exhaust gas purifying device according to claim 77, wherein the thickness of said outer edge wall is at least about 1.3 times and at most about 3.0 times greater than the thickness of said cell wall.

79. The exhaust gas purifying device according to claim 76, wherein either one of opposite end portions of each of said cells in the longitudinal direction is sealed.

80. The honeycomb structured body according to claim 76, wherein at least one outer corner at an outer periphery of said porous ceramic members has a shape of a chamfered corner.

81. The honeycomb structured body according to claim 76, wherein each outer corner in the longitudinal direction of said porous ceramic members has a shape of a chamfered corner.

82. The exhaust gas purifying device according to claim 76, wherein said porous ceramic members have an aperture ratio of the cells of about 60% or more at a cross-section perpendicular to the longitudinal direction.

83. The honeycomb structured body according to claim 76, wherein a thickness of said cell wall is at least about 0.1 mm and at most about 0.4 mm.

84. The exhaust gas purifying device according to claim 83, wherein the thickness of said cell wall is in the range of about 0.2 mm to about 0.3 mm.

85. The honeycomb structured body according to claim 76, wherein a length of a chamfered portion of said shape of the chamfered corner is at least about 0.3 mm and at most about 2.5 mm in a cross-section perpendicular to said cells.

86. The honeycomb structured body according to claim 76, wherein a ratio of a length of a chamfered portion of said shape of the chamfered corner with respect to a length of one side of said porous ceramic members is at least about 0.8% and at most about 7.5%, in a cross-section perpendicular to said cells.

87. The exhaust gas purifying device according to claim 76, wherein a catalyst is supported on said honeycomb structured body.

* * * * *

UNITED STATES PATENT AND TRADEMARK OFFICE
CERTIFICATE OF CORRECTION

PATENT NO.        : 8,178,185 B2
APPLICATION NO.   : 11/600775
DATED             : May 15, 2012
INVENTOR(S)       : Hiroshi Sakaguchi et al.

It is certified that error appears in the above-identified patent and that said Letters Patent is hereby corrected as shown below:

In claim 34, col. 28, line 56, "claim 24" should read --claim 33--.

In claim 85, col. 34, line 1, "claim 76" should read --claim 80--.

In claim 86, col. 34, line 5, "claim 76" should read --claim 80--.

Signed and Sealed this
Twenty-fifth Day of September, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,178,185 B2 | Page 1 of 1 |
| APPLICATION NO. | : 11/600775 | |
| DATED | : May 15, 2012 | |
| INVENTOR(S) | : Hiroshi Sakaguchi et al. | |

It is certified that error appears in the above-identified patent and that said Letters Patent is hereby corrected as shown below:

In the Claims

In claim 71, col. 32, line 33, "cllaim" should read -- claim --.

Signed and Sealed this
Twenty-second Day of July, 2014

Michelle K. Lee
*Deputy Director of the United States Patent and Trademark Office*